United States Patent
Kim et al.

(10) Patent No.: US 12,391,134 B2
(45) Date of Patent: Aug. 19, 2025

(54) WIRELESS CHARGING DEVICE, AND TRANSPORTATION MEANS COMPRISING SAME

(71) Applicant: SKC CO., LTD., Gyeonggi-do (KR)

(72) Inventors: Tae Kyoung Kim, Gyeonggi-do (KR); Jong Hak Choi, Gyeonggi-do (KR); Nah Young Kim, Gyeonggi-do (KR); Seunghwan Lee, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 779 days.

(21) Appl. No.: 17/764,469

(22) PCT Filed: Oct. 29, 2020

(86) PCT No.: PCT/KR2020/014932
§ 371 (c)(1),
(2) Date: Mar. 28, 2022

(87) PCT Pub. No.: WO2021/086066
PCT Pub. Date: May 6, 2021

(65) Prior Publication Data
US 2022/0332197 A1    Oct. 20, 2022

(30) Foreign Application Priority Data

Oct. 29, 2019 (KR) .................. 10-2019-0135517
Apr. 22, 2020 (KR) .................. 10-2020-0048503
May 14, 2020 (KR) .................. 10-2020-0057764

(51) Int. Cl.
*H01F 27/36* (2006.01)
*B60L 53/12* (2019.01)
(Continued)

(52) U.S. Cl.
CPC .............. *B60L 53/12* (2019.02); *H01F 27/22* (2013.01); *H01F 27/36* (2013.01); *H02J 50/005* (2020.01); *H02J 50/10* (2016.02); *H02J 50/70* (2016.02)

(58) Field of Classification Search
CPC ...... H04B 5/00; H04B 5/0037; H04B 5/0075; H04B 5/0081; H04B 5/0025;
(Continued)

(56) References Cited

U.S. PATENT DOCUMENTS

2009/0021212 A1 *  1/2009  Hasegawa ........... H01F 27/2885
                                                   320/108
2009/0267721 A1   10/2009  Okada et al.
(Continued)

FOREIGN PATENT DOCUMENTS

DE    102017207266 A1    10/2018
JP    2004-140026 A       5/2004
(Continued)

OTHER PUBLICATIONS

SAE International's standard for wireless power transfer for electric vehicles SAE J2954 (Year: 2010).*
(Continued)

*Primary Examiner* — Julian D Huffman
*Assistant Examiner* — Lisa Kotowski
(74) *Attorney, Agent, or Firm* — IP & T GROUP LLP

(57) ABSTRACT

A wireless charging device according to one embodiment comprises two types of magnetic parts having different magnetic properties, wherein the two types of magnetic parts can be appropriately arranged to effectively disperse heat, generated during wireless charging, through the distribution of magnetic flux, and improve durability against external shock or distortion. Accordingly, the wireless charging device may be usefully used in a transportation
(Continued)

means, such as an electric vehicle, that requires a large amount of power transmission between a transmitter and a receiver.

14 Claims, 11 Drawing Sheets

(51) Int. Cl.
*H01F 27/22* (2006.01)
*H02J 50/00* (2016.01)
*H02J 50/10* (2016.01)
*H02J 50/12* (2016.01)
*H02J 50/70* (2016.01)

(58) Field of Classification Search
CPC ... H04B 5/0093; H04B 5/0087; B60L 11/182; B60L 11/1829; B60L 11/1831; B60L 2230/14; B60L 53/38; B60L 53/39; B60L 53/34; H02J 7/025; H02J 17/00; H02J 5/005; H02J 50/00; H02J 50/10; H02J 50/05; H02J 50/12; H02J 50/15; H02J 50/20; H02J 50/23; H02J 50/27; H02J 50/30; H02J 50/40; H02J 50/50; H02J 50/60; H02J 50/70; H02J 50/80; H02J 50/90; Y02T 90/122; H01F 38/14; H01F 2038/146; H01F 27/22; H01F 27/36; H01F 27/361; H01F 36/363; A61N 1/3787; A61B 1/00029; A61M 2205/8243; A61M 60/873; B60C 23/0413
See application file for complete search history.

(56) References Cited

U.S. PATENT DOCUMENTS

| | | | |
|---|---|---|---|
| 2014/0111022 A1 | 4/2014 | Yamakawa | |
| 2015/0326056 A1* | 11/2015 | Koyanagi | H01F 38/14 320/108 |
| 2017/0178800 A1 | 6/2017 | Muratov | |
| 2018/0286546 A1 | 10/2018 | Lee et al. | |
| 2019/0027965 A1* | 1/2019 | Huang | G01R 33/0283 |
| 2020/0198483 A1 | 6/2020 | Laemmle et al. | |
| 2021/0044019 A1 | 2/2021 | Sohn et al. | |

FOREIGN PATENT DOCUMENTS

| | | |
|---|---|---|
| JP | 2009-027025 A | 2/2009 |
| JP | 2009-267077 A | 11/2009 |
| JP | 2011-211337 A | 10/2011 |
| JP | 2013-017254 A | 1/2013 |
| JP | 2014-220953 A | 11/2014 |
| JP | 2018-536983 A | 12/2018 |
| KR | 10-2011-0042403 A | 4/2011 |
| KR | 10-2014-0067957 A | 6/2014 |
| KR | 10-2017-0010868 A | 2/2017 |
| KR | 10-2018-000490 A | 1/2018 |
| KR | 10-1971091 B1 | 4/2019 |
| KR | 10-2019-0092317 A | 8/2019 |
| WO | 2011/121933 A1 | 10/2011 |

OTHER PUBLICATIONS

Office Action issued by the Korean Intellectual Property Office on Apr. 25, 2022.
Office Action for the Chinese Patent Application No. 202080076715.9 issued by the Chinese Patent Office on Nov. 30, 2023.
Office Action for the Japanese Patent Application No. 2022-520628 issued by the Japanese Patent Office on Mar. 28, 2023.

* cited by examiner

[Fig. 1a]
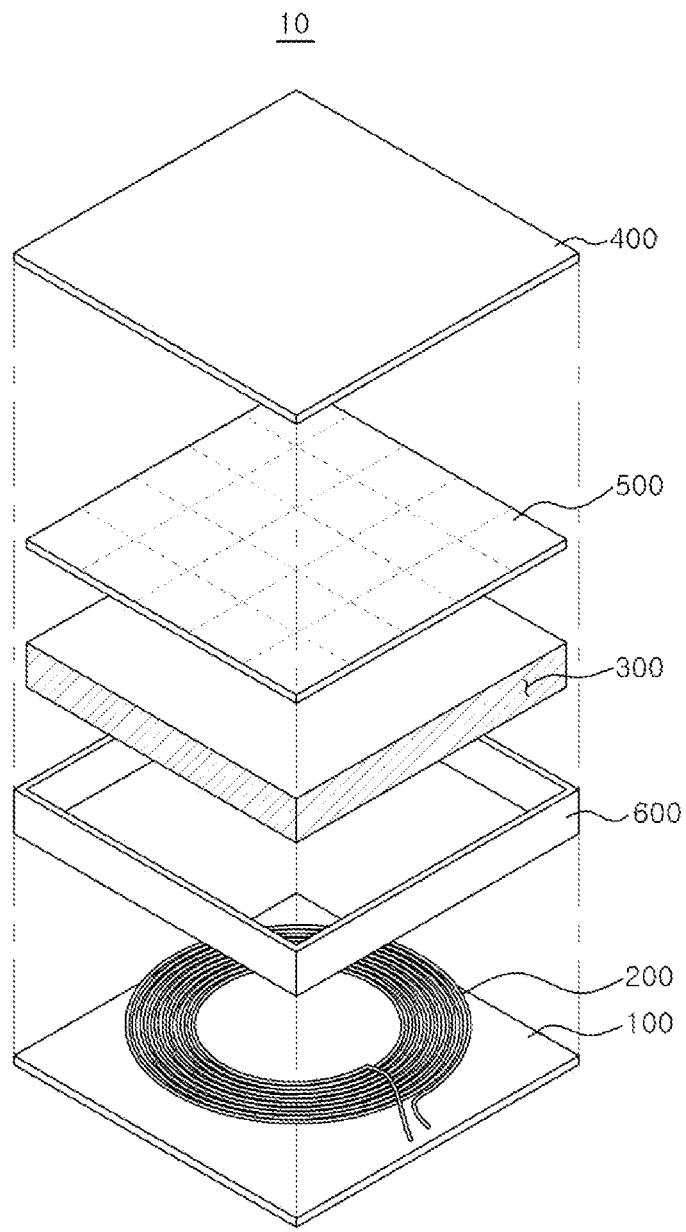

[Fig. 1b]
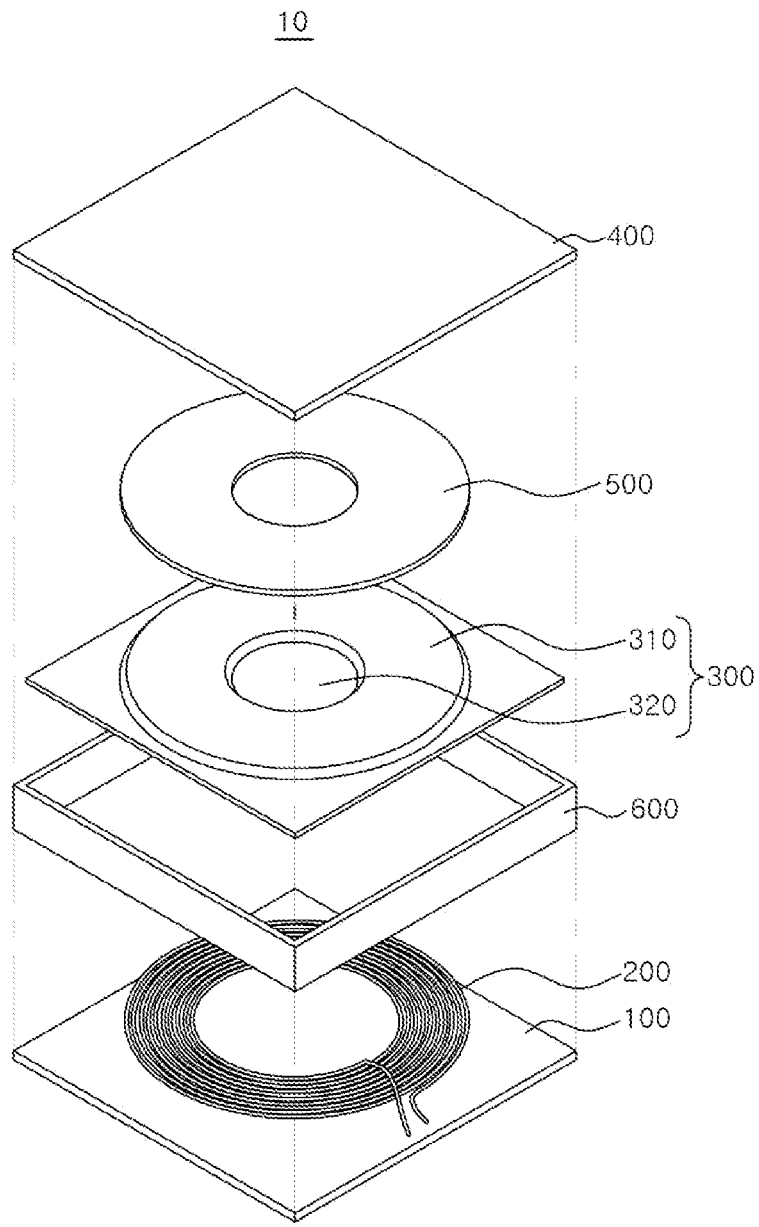

[Fig. 2a]
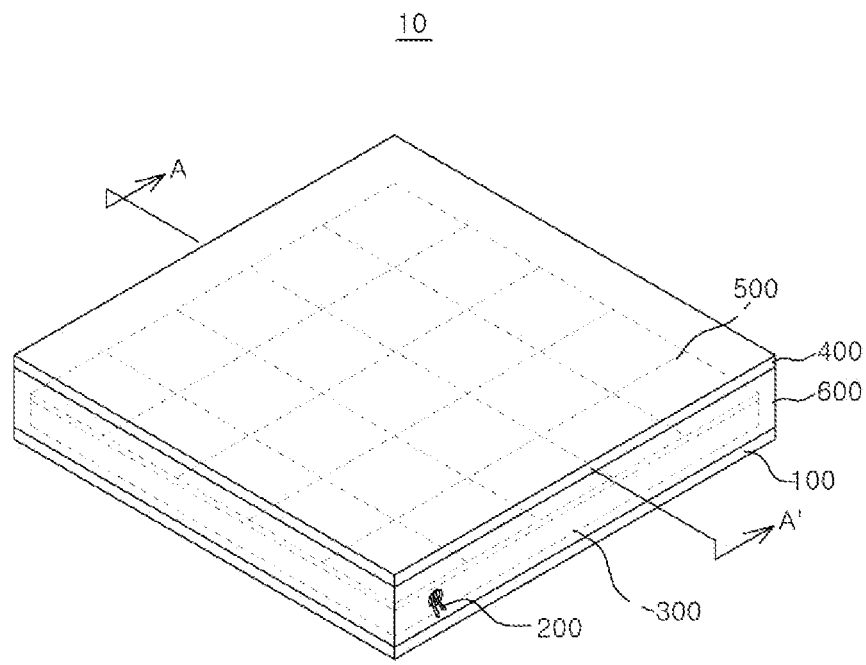
[Fig. 2b]
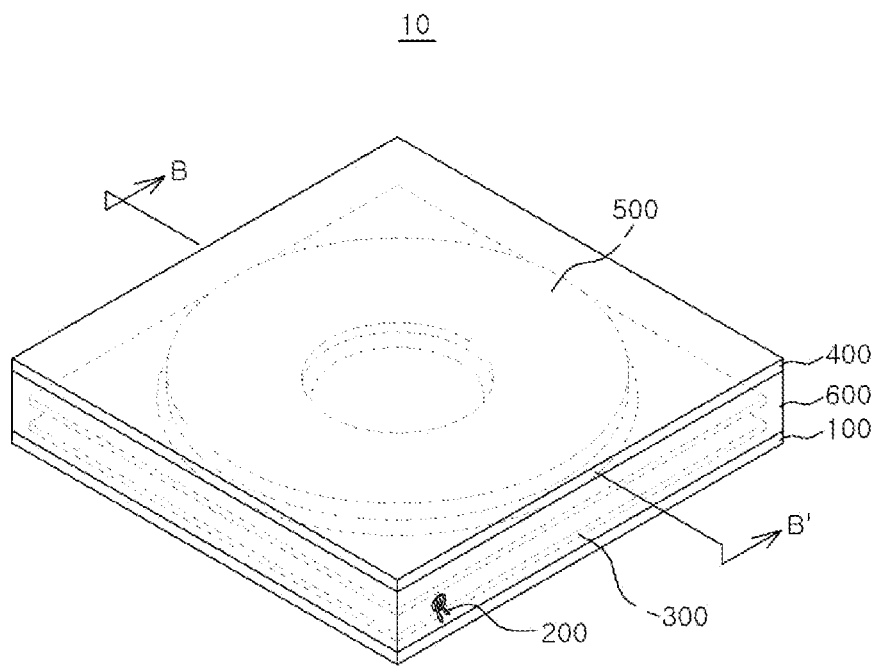

[Fig. 3a]
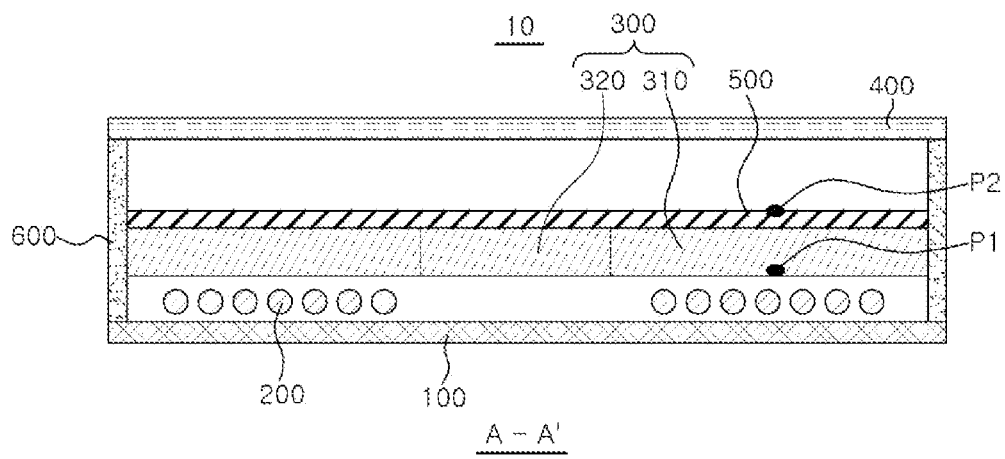
A - A'
[Fig. 3b]
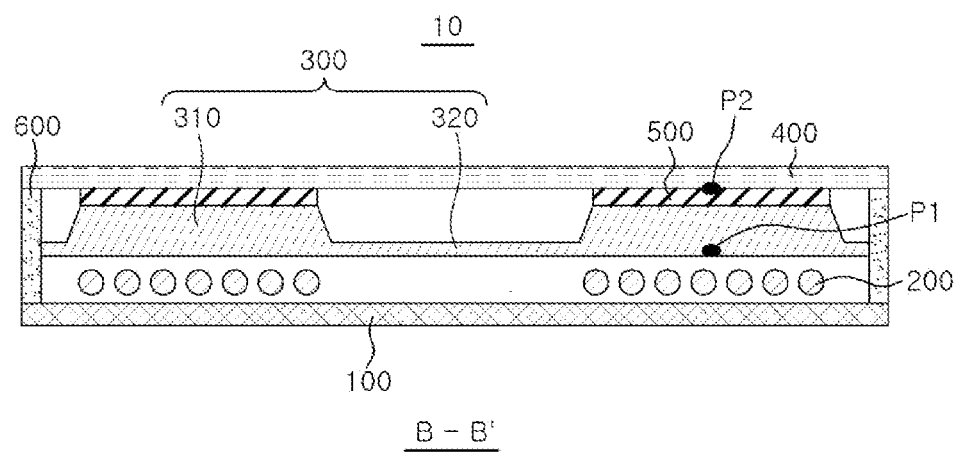
B - B'
[Fig. 3c]
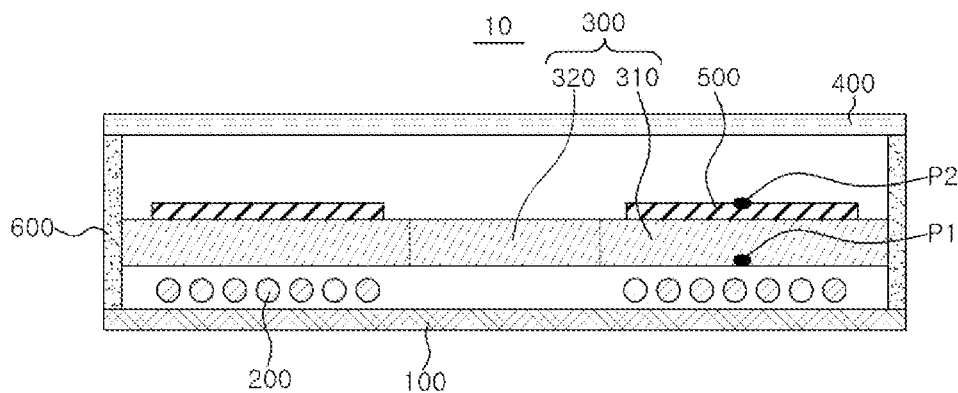

[Fig. 3d]
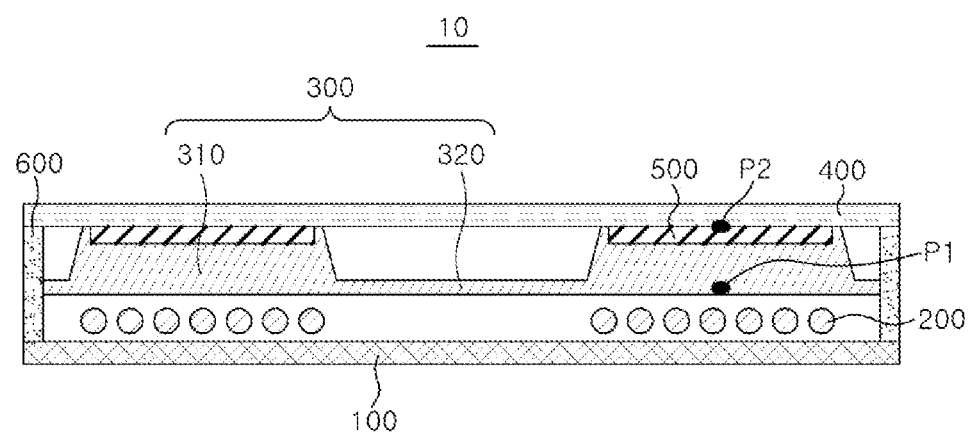

[Fig. 4]
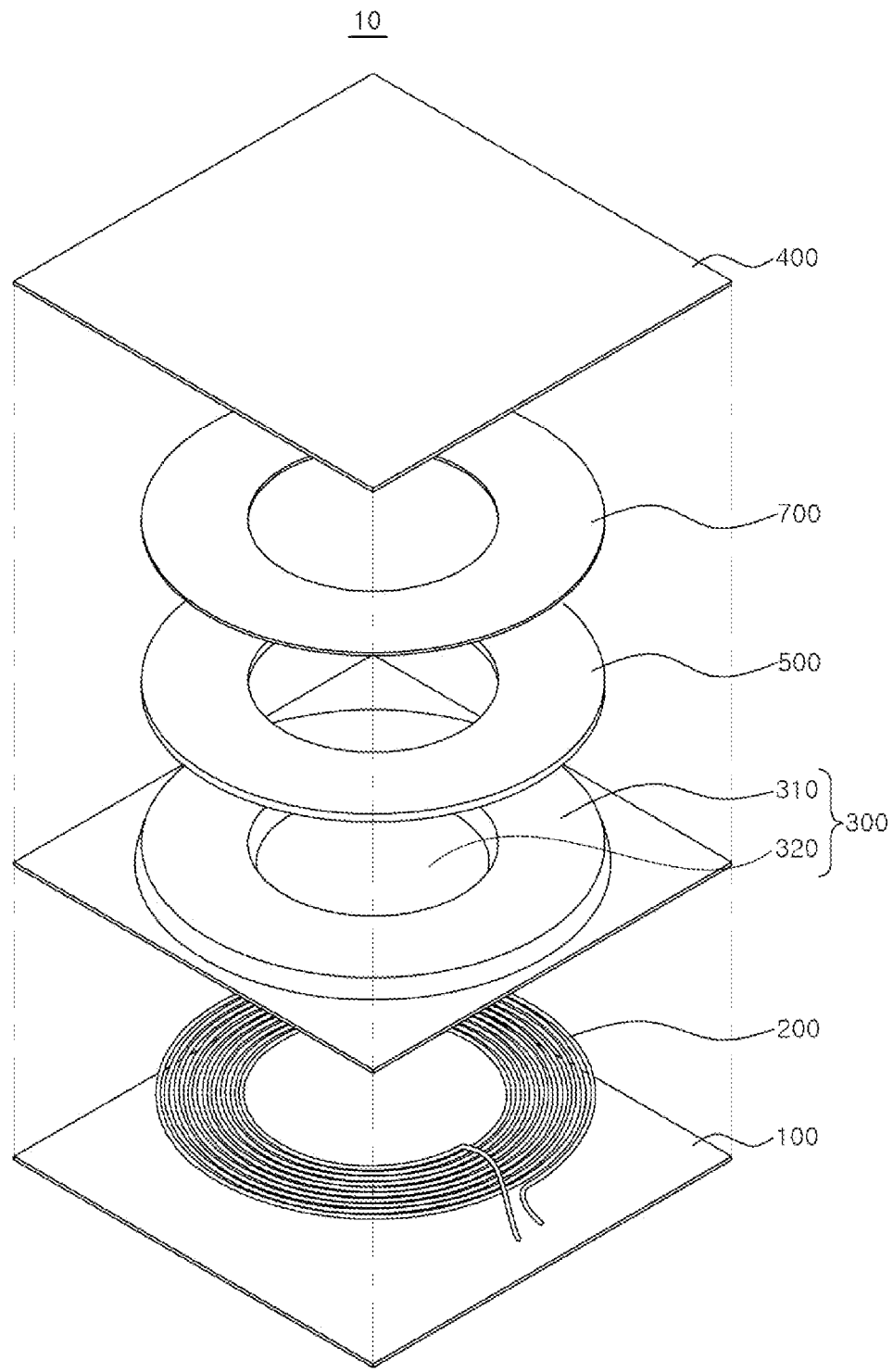

[Fig. 5a]
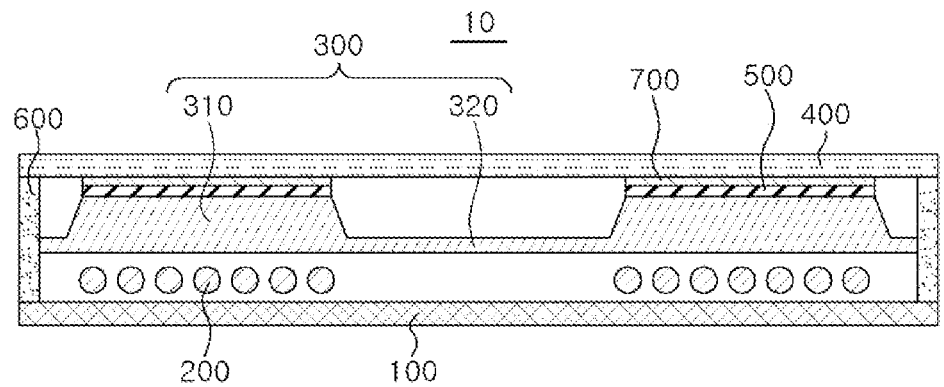
[Fig. 5b]
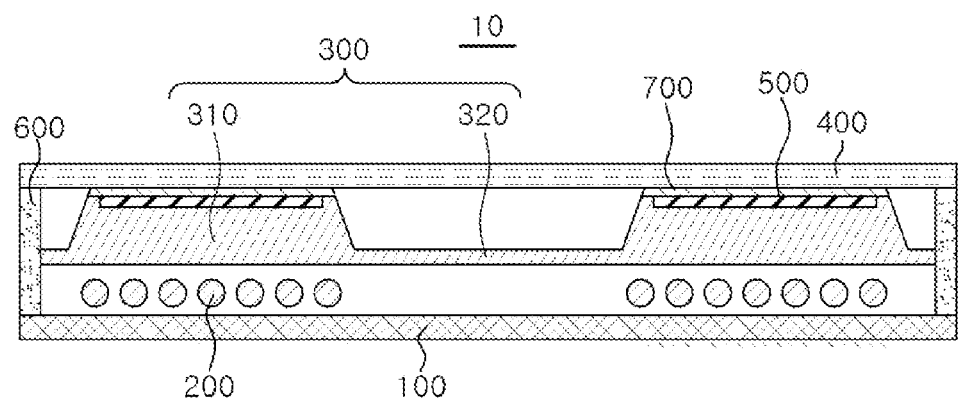
[Fig. 5c]
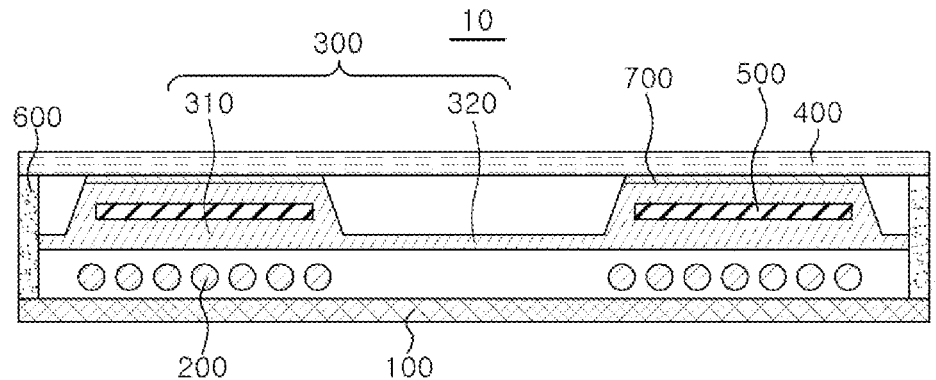

[Fig. 6]
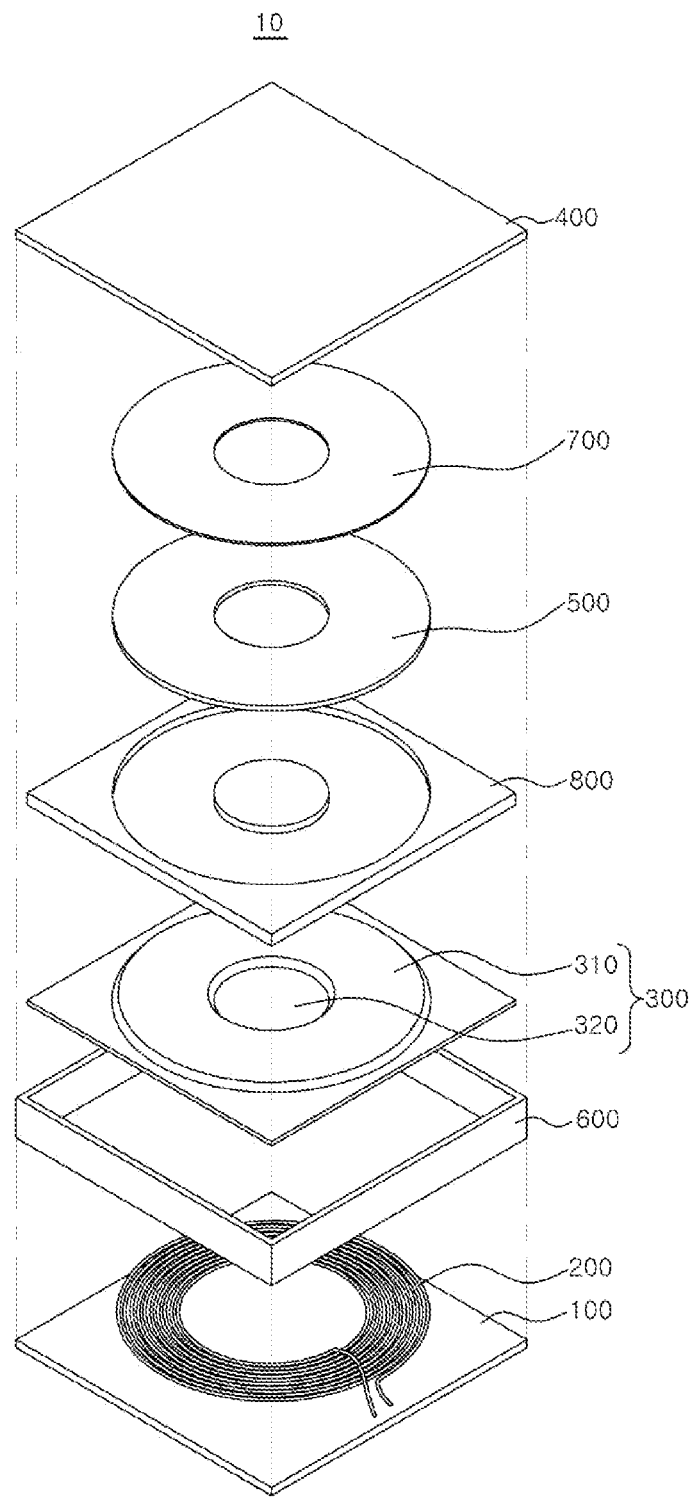

[Fig. 7]
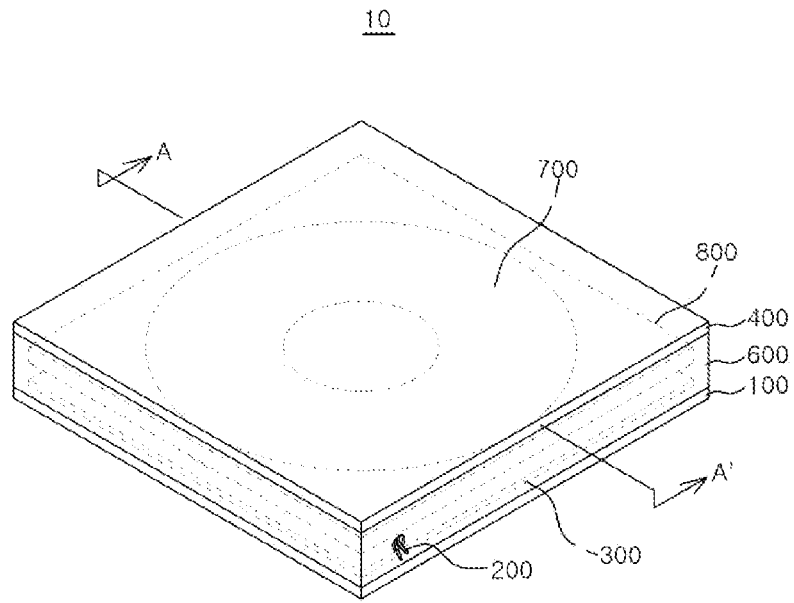
[Fig. 8a]
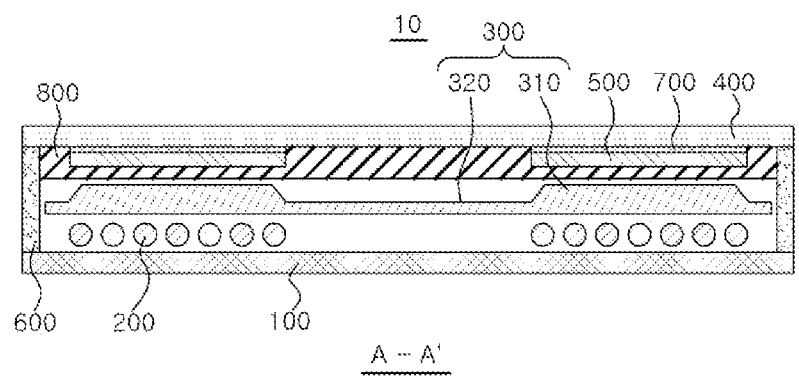
A – A'
[Fig. 8b]
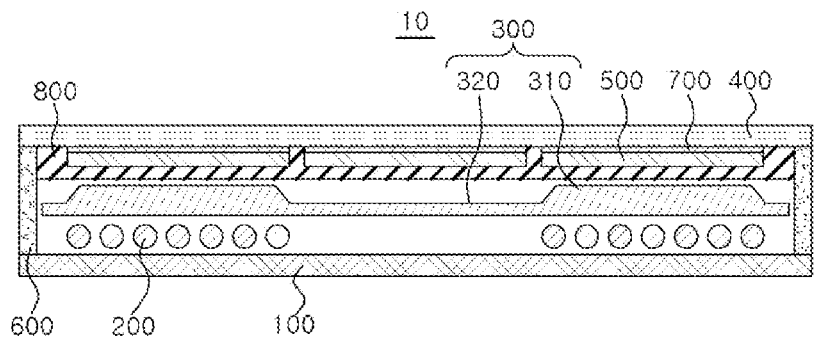

[Fig. 9a]
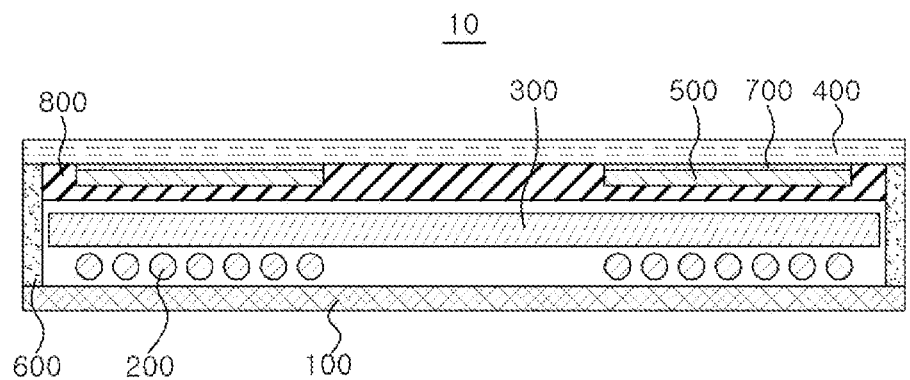
[Fig. 9b]
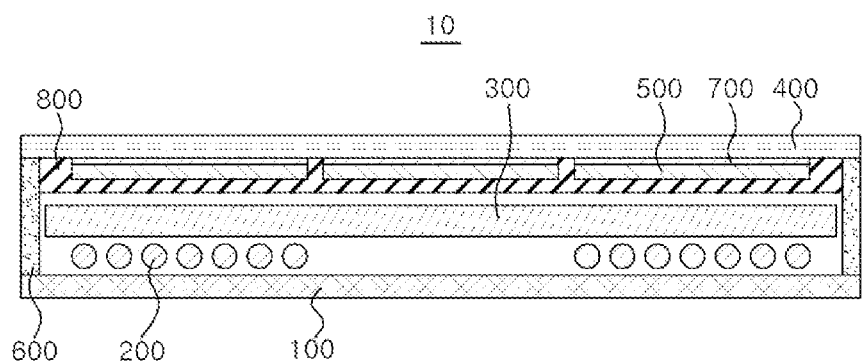
[Fig. 10]
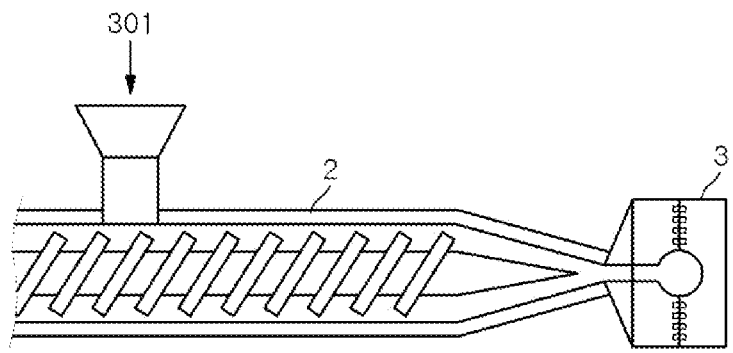

[Fig. 11]
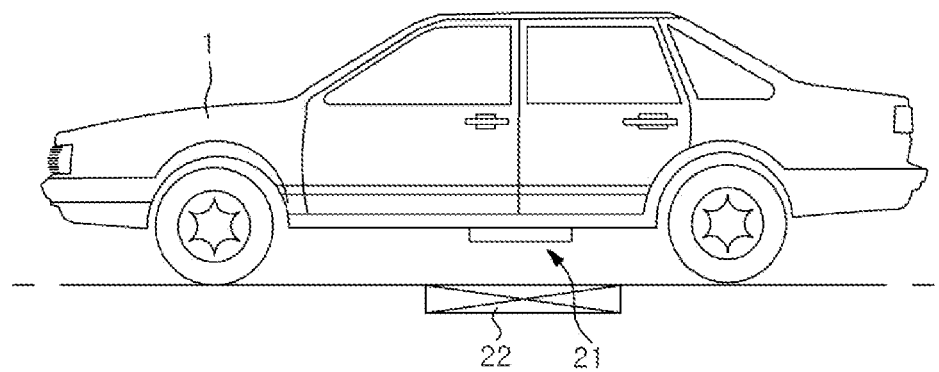

WIRELESS CHARGING DEVICE, AND TRANSPORTATION MEANS COMPRISING SAME

This application is a national stage application of PCT/KR2020/014932 filed on Oct. 29, 2020, which claims priority of Korean patent application number 10-2019-0135517 filed on Oct. 29, 2019, Korean patent application number 10-2020-0048503 filed on Apr. 22, 2020 and Korean patent application number 10-2020-0057764 filed on May 14, 2020. The disclosure of each of the foregoing applications is incorporated herein by reference in its entirety.

TECHNICAL FIELD

Embodiments relate to a wireless charging device and a transportation means comprising the same. More specifically, the embodiments relate to a wireless charging device with enhanced charging efficiency through a heat dissipation structure and a transportation means comprising the same.

BACKGROUND ART

In recent years, the information and communication field is being developed at a very fast pace, and various technologies that comprehensively combine electricity, electronics, communication, and semiconductor are continuously being developed. In addition, as electronic devices tend to be more mobile, research on wireless communication and wireless power transmission technologies is being actively conducted in the communication field. In particular, research on a method for wirelessly transmitting power to electronic devices is being actively conducted.

The wireless power transmission refers to wirelessly transmitting power through space using inductive coupling, capacitive coupling, or an electromagnetic field resonance structure such as an antenna without physical contact between a transmitter that supplies power and a receiver that receives power. The wireless power transmission is suitable for portable communication devices, electric vehicles, and the like that require a large-capacity battery. Since the contacts are not exposed, there is little risk of a short circuit, and a charging failure phenomenon in a wired method can be prevented.

Meanwhile, as interest in electric vehicles has rapidly increased in recent years, interest in building charging infrastructure is increasing. Various charging methods have already appeared, such as electric vehicle charging using home chargers, battery replacement, rapid charging devices, and wireless charging devices. A new charging business model has also begun to appear (see Korean Laid-open Patent Publication No. 2011-0042403). In addition, electric vehicles and charging stations that are being tested begin to stand out in Europe. In Japan, electric vehicles and charging stations are being piloted, led by automakers and power companies.

In a conventional wireless charging device used for electric vehicles, a magnetic material is disposed adjacent to a coil to enhance the wireless charging efficiency, and a metal plate for shielding is disposed to be spaced apart from the magnetic material by a predetermined interval.

A wireless charging device generates heat due to the resistance of a coil and the magnetic loss of a magnetic material during the wireless charging operation. In particular, the magnetic material in a wireless charging device generates heat in a part close to the coil with a high electromagnetic wave energy density. The generated heat may change the magnetic characteristics of the magnetic material and cause an impedance mismatch between the transmitter and receiver, which deteriorates the charging efficiency. As a result, the generation of heat is, in turn, aggravated. However, since such a wireless charging device is installed in the lower part of an electric vehicle, a sealed structure is adopted for dustproofing, waterproofing, and shock absorption. Thus, it is difficult to implement a heat dissipation structure.

PRIOR ART DOCUMENT (Patent Document 1) Korean Laid-open Patent Publication No. 2011-0042403

DETAILED DESCRIPTION OF INVENTION

Technical Problem

In the conventional wireless charging devices, a sintered ferrite sheet as a magnetic material is commonly interposed between a coil and a metal plate, especially, on one side close to the coil. However, the sintered ferrite sheet has a high specific gravity, and when the distance between the coil and the metal plate becomes close (e.g., 10 mm), there is a problem in that the efficiency steeply decreases.

Therefore, a separate structure such as a spacer is required to maintain the distance between the coil and the metal plate and to stably fix the sintered ferrite sheet. As a result, there is a problem in that the cost of the assembly process increases. In addition, heat is generated from the coil and the sintered ferrite sheet during charging. In particular, the heat generated from the sintered ferrite sheet is hardly transferred and dissipated to air or spacers having low thermal conductivity characteristics. As a result, the sintered ferrite sheet with an elevated temperature is deteriorated in magnetic properties, which changes the inductance value of the coil, thereby deteriorating the charging efficiency and causing more severe heat generation.

To solve this problem, if a magnetic material that is sufficiently thick to fill the empty space between the coil and the metal plate is adopted, the heat dissipation characteristics can be improved, whereas the high specific gravity of the magnetic material increases the overall weight, which may cause a problem in reducing the weight of a vehicle and significantly increase the manufacturing cost. In addition, a method of filling the empty space between the magnetic material and the metal plate with a heat dissipating material is also being considered. In such a case, the charging efficiency decreases and the manufacturing cost increases due to the electrical conductivity or insulation of the heat dissipating material. If only a part of the empty space between the magnetic material and the metal plate is filled with a heat dissipating material, the heat dissipation performance would not be sufficient.

As a result of research conducted by the present inventors, therefore, it has been discovered that as a hybrid-type magnetic material, in which two or more types of magnetic materials having different magnetic permeabilities at a frequency applied to wireless charging of electric vehicles are combined, is introduced to a wireless charging device, it is possible to enhance the charging efficiency, heat dissipation characteristics, and durability.

Accordingly, the problem to be solved by the embodiment is to provide a wireless charging device with improved charging efficiency, heat dissipation characteristics, and durability by introducing two or more types of magnetic materials having different magnetic properties, and a transportation means comprising the same.

Solution to Problem

According to an embodiment, there is provided a wireless charging device, which comprises a coil unit; a shield unit disposed on the coil unit; and a magnetic unit comprising a first magnetic unit and a second magnetic unit and disposed between the coil unit and the shield unit, wherein the second magnetic unit has a magnetic permeability at 85 kHz higher than that of the first magnetic unit.

According to another embodiment, there is provided a transportation means, which comprises a wireless charging device, wherein the wireless charging device comprises a coil unit; a shield unit disposed on the coil unit; and a magnetic unit comprising a first magnetic unit and a second magnetic unit and disposed between the coil unit and the shield unit, and the second magnetic unit has a magnetic permeability at 85 kHz higher than that of the first magnetic unit.

Advantageous Effects of Invention

As the wireless charging device according to an embodiment comprises two types of magnetic units having different magnetic permeabilities at a frequency applied to wireless charging of electric vehicles, it is possible to enhance the charging efficiency, heat dissipation characteristics, and durability.

Specifically, the two types of magnetic units have different magnetic properties such as magnetic permeability. When there is one or more magnetic units, the magnetic flux density increases in the order of the magnitude of magnetic permeability. Thus, it is possible to distribute the magnetic flux focused during wireless charging in a desired direction by combining them. In addition, heat is generated in a magnitude proportional to the amount of magnetic flux focused on the magnetic unit and magnetic permeability loss during wireless charging. Thus, as two types of magnetic units are arranged at appropriate intervals, heat can be effectively transferred to the shield unit and dissipated to the outside, and it is possible to suppress damage due to an external impact or distortion that may be imposed during driving of the vehicle.

Accordingly, the wireless charging device can be advantageously used in a transportation means such as electric vehicles that requires large-capacity power transmission between a transmitter and a receiver.

BRIEF DESCRIPTION OF DRAWING

FIGS. 1a, 2a, and 3a are each an exploded perspective view, a perspective view, and a cross-sectional view of a wireless charging device according to an embodiment.

FIGS. 1b, 2b, and 3b are each an exploded perspective view, a perspective view, and a cross-sectional view of a wireless charging device according to another embodiment.

FIGS. 3c and 3d are each a cross-sectional view of a wireless charging device according to still another embodiment.

FIG. 4 is an exploded perspective view of a wireless charging device according to still another embodiment.

FIGS. 5a to 5c are each a cross-sectional view of a wireless charging device according to still another embodiment.

FIGS. 6, 7, and 8a are each an exploded perspective view, a perspective view, and a cross-sectional view of a wireless charging device according to still another embodiment.

FIGS. 8b to 9b are each a cross-sectional view of a wireless charging device according to still another embodiment.

FIG. 10 illustrates a process of forming a magnetic unit through a mold.

FIG. 11 shows an electric vehicle provided with a wireless charging device as a receiver.

<Explanation of Reference Numerals>

| | |
|---|---|
| 1: transportation means (electric vehicle) | |
| 2: injection molding machine | 3: mold |
| 10: wireless charging device | |
| 21: receiver | 22: transmitter |
| 100: support unit | 200: coil unit |
| 300: first magnetic unit | 301: raw material composition |
| 310: outer part | 320: central part |
| 400: shield unit | 500: second magnetic unit |
| 600: housing | |
| 700: heat dissipation unit | 800: tray |
| P1: lower side of the first magnetic unit | |
| P2: upper side of the second magnetic unit | |

BEST MODE FOR CARRYING OUT THE INVENTION

In the following description of the embodiments, in the case where an element is mentioned to be formed "on" or "under" another element, it means not only that one element is directly formed "on" or "under" another element, but also that one element is indirectly formed on or under another element with other element(s) interposed between them.

In addition, the term on or under with respect to each element may be referenced to the drawings. For the sake of description, the sizes of individual elements in the appended drawings may be exaggeratedly depicted, and they may differ from the actual sizes.

Throughout the present specification, when a part is referred to as "comprising" an element, it is understood that other elements may be comprised, rather than other elements are excluded, unless specifically stated otherwise.

In addition, all numbers expressing the physical properties, dimensions, and the like of elements used herein are to be understood as being modified by the term "about" unless otherwise indicated.

In the present specification, a singular expression is understood to encompass a singular or plural expression, interpreted in context, unless otherwise specified.

Wireless Charging Device

The wireless charging device according to an embodiment comprises a coil unit; a shield unit disposed on the coil unit; and a magnetic unit comprising a first magnetic unit and a second magnetic unit and disposed between the coil unit and the shield unit, wherein the second magnetic unit has a magnetic permeability at 85 kHz higher than that of the first magnetic unit.

As the wireless charging device according to an embodiment comprises two types of magnetic units having different magnetic permeabilities at a frequency applied to wireless charging of electric vehicles, it is possible to enhance the charging efficiency, heat dissipation characteristics, and durability.

Meanwhile, if two or more magnetic units as a hybrid-type magnetic unit are used in combination while these magnetic units are simply stacked and disposed without special consideration, the magnetic flux is not properly distributed during wireless charging, whereby heat generated is not effectively transferred to the outside, and it may be easily damaged by an external impact that may be imposed during driving of the vehicle.

In order to solve this problem, the second magnetic unit having a larger amount of heat generated during wireless charging than that of the first magnetic unit among the magnetic units may be disposed closer to the shield unit. For example, when the second magnetic unit is disposed on the first magnetic unit and the coil unit receives wireless power from the outside, more heat may be generated in the second magnetic unit than in the first magnetic unit.

Referring to FIGS. 1a and 1b, the wireless charging device (10) according to an embodiment comprises a coil unit (200); a first magnetic unit (300) disposed on the coil unit (200); a second magnetic unit (500) disposed on the first magnetic unit (300); and a shield unit (400) disposed on the second magnetic unit (500), wherein when the coil unit (200) receives wireless power from the outside, more heat may be generated in the second magnetic unit (500) than in the first magnetic unit (300).

According to the above embodiment, two or more types of magnetic units having different amounts of heat generation during wireless charging are used while they are arranged in view of their characteristics, whereby it is possible to reduce the heat generated during wireless charging and to further enhance the charging efficiency. Specifically, as the second magnetic unit having a larger amount of heat generated during wireless charging than that of the first magnetic unit among the magnetic units is disposed closer to the shield unit, it is possible to effectively distribute the magnetic flux density and heat dissipation, thereby increasing the wireless charging efficiency, and to dissipate the heat generated from the second magnetic unit through the shield unit, thereby effectively enhancing the heat dissipation characteristics.

In addition, as a three-dimensional structure is applied to the magnetic unit adopted in the wireless charging device, and a heat dissipation unit is appropriately used with an additional magnetic unit having different magnetic characteristics, the charging efficiency and heat dissipation characteristics can be enhanced. For example, the wireless charging device further comprises a heat dissipation unit disposed between the shield unit and the magnetic unit, wherein the first magnetic unit may comprise an outer part corresponding to a part where the coil unit is disposed; and a central part surrounded by the outer part, and the outer part may have a thickness greater than the thickness of the central part.

Referring to FIG. 4, the wireless charging device (10) according to an embodiment comprises a coil unit (200) comprising a conductive wire; a shield unit (400) disposed on the coil unit (200); a magnetic unit disposed between the coil unit (200) and the shield unit (400) and comprising a first magnetic unit (300) and a second magnetic unit (500); and a heat dissipation unit (700) disposed between the shield unit (400) and the second magnetic unit (500), wherein the first magnetic unit (300) may comprise an outer part (310) corresponding to a part where the coil unit (200) is disposed and a central part (320) surrounded by the outer part (310), the outer part (310) may have a thickness greater than the thickness of the central part (320), and the second magnetic unit (500) may have a magnetic permeability at 85 kHz higher than that of the first magnetic unit (300).

According to the above embodiment, as a three-dimensional structure is applied to the magnetic unit adopted in the wireless charging device, and two types of magnetic units are provided, the charging efficiency and heat dissipation characteristics can be enhanced together. Specifically, according to the above embodiment, as the thickness of the magnetic unit near the coil unit where electromagnetic energy is concentrated during wireless charging is increased, and the thickness of the central magnetic unit having a relatively low electromagnetic energy density is decreased, it is possible to increase the wireless charging efficiency and to reduce the heat generated in the magnetic unit. In addition, as the second magnetic unit having a higher magnetic permeability than that of the first magnetic unit is adopted, it is possible to effectively distribute the magnetic flux density and heat dissipation, thereby increasing the wireless charging efficiency, and to dissipate the heat generated from the second magnetic unit through the shield unit to the outside, thereby enhancing the heat dissipation characteristics. In addition, the heat dissipation unit may prevent the magnetic unit from being damaged by an external impact while allowing the heat of the magnetic unit to be readily transferred to the shield unit.

In addition, as the distance from the shield unit is adjusted according to the characteristics of the first magnetic unit and the second magnetic unit, it is possible to effectively disperse the heat generated during wireless charging through the distribution of magnetic flux and to enhance the durability against an external impact or distortion. Specifically, the second magnetic unit may be disposed on the first magnetic unit (i.e., disposed between the first magnetic unit and the shield unit), and the second magnetic unit may be thermally connected to the shield unit.

Referring to FIGS. 6, 7, and 8a to 9b, the wireless charging device (10) according to an embodiment comprises a coil unit (200); a first magnetic unit (300) disposed on the coil unit (200); a second magnetic unit (500) disposed on the first magnetic unit (300) and having a magnetic permeability higher than that of the first magnetic unit (300); and a shield unit (400) disposed on the coil unit (400), wherein the second magnetic unit (500) may be thermally connected to the shield unit (400).

According to the above embodiment, two types of magnetic units are adopted while the magnetic unit having a higher magnetic permeability is disposed adjacent to the shield unit, whereby it is possible to effectively disperse the heat generated during wireless charging through the distribution of magnetic flux. In addition, the materials of the two types of magnetic units are adjusted, so that the durability against an external impact or distortion can be enhanced. Specifically, the two types of magnetic units have different magnetic properties such as magnetic permeability. When there is one or more magnetic units, the magnetic flux density increases in the order of the magnitude of magnetic permeability. Thus, it is possible to distribute the magnetic flux focused during wireless charging in a desired direction by combining them. In addition, heat is generated in a magnitude proportional to the amount of magnetic flux focused on the magnetic unit and magnetic permeability loss during wireless charging. Thus, as the two types of magnetic units are arranged at appropriate intervals, heat can be effectively transferred to the shield unit and dissipated to the outside, and it is possible to suppress damage due to external shock or distortion that may be imposed during driving of the vehicle.

Hereinafter, each constitutional element of the wireless charging device will be described in detail.

Coil Unit

The coil unit may comprise a conductive wire.

The conductive wire comprises a conductive material. For example, the conductive wire may comprise a conductive metal. Specifically, the conductive wire may comprise at least one metal selected from the group consisting of copper, nickel, gold, silver, zinc, and tin.

In addition, the conductive wire may have an insulating sheath. For example, the insulating sheath may comprise an insulating polymer resin. Specifically, the insulating sheath may comprise a polyvinyl chloride (PVC) resin, a polyethylene (PE) resin, a Teflon resin, a silicone resin, a polyurethane resin, or the like.

The conductive wire may have a diameter of, for example, 1 mm to 10 mm, 1 mm to 5 mm, or 1 mm to 3 mm.

The conductive wire may be wound in the form of a planar coil. Specifically, the planar coil may comprise a planar spiral coil. In addition, the planar shape of the coil may be a circle, an ellipse, a polygon, or a polygonal shape with rounded corners, but it is not particularly limited thereto.

The planar coil may have an outer diameter of 5 cm to 100 cm, 10 cm to 50 cm, 10 cm to 30 cm, 20 cm to 80 cm, or 50 cm to 100 cm. As a specific example, the planar coil may have an outer diameter of 10 cm to 50 cm.

In addition, the planar coil may have an inner diameter of 0.5 cm to 30 cm, 1 cm to 20 cm, or 2 cm to 15 cm.

The number of turns of the planar coil may be 5 to 50 times, 10 to 30 times, 5 to 30 times, 15 to 50 times, or 20 to 50 times. As a specific example, the planar coil may be formed by winding the conductive wire 10 to 30 times.

In addition, the distance between the conductive wires in the planar coil shape may be 0.1 cm to 1 cm, 0.1 cm to 0.5 cm, or 0.5 cm to 1 cm.

Within the preferred dimensions and specification ranges of the plane coil as described above, it can be appropriately used in the fields such as electric vehicles that require large-capacity power transmission.

The coil unit may be disposed to be spaced apart from the first magnetic unit by a predetermined interval. For example, the spaced distance between the coil unit and the first magnetic unit may be 0.2 mm or more, 0.5 mm or more, 0.2 mm to 3 mm, or 0.5 mm to 1.2 mm.

Shield Unit

The shield unit is disposed on the coil and the magnetic unit.

The shield unit suppresses electromagnetic interference (EMI) that may be generated by leakage of electromagnetic waves to the outside through electromagnetic shielding.

The shield unit may be disposed to be spaced apart from the coil unit by a predetermined interval. For example, the spaced distance between the shield unit and the coil unit may be 10 mm or more or 15 mm or more, specifically, 10 mm to 30 mm or 10 mm to 20 mm.

In addition, the shield unit may be disposed to be spaced apart from the first magnetic unit by a predetermined interval. For example, the spaced distance between the shield unit and the first magnetic unit may be 3 mm or more, 5 mm or more, 3 mm to 10 mm, or 4 mm to 7 mm.

The material of the shield unit may be, for example, a metal. Thus, the shield unit may be a metal plate, but it is not particularly limited thereto. As a specific example, the material of the shield unit may be aluminum. Other metals or alloy materials having an electromagnetic wave shielding ability may be used.

The shield unit may have a thickness of 0.2 mm to 10 mm, 0.5 mm to 5 mm, or 1 mm to 3 mm. In addition, the shield unit may have an area of 200 cm$^2$ or more, 400 cm$^2$ or more, or 600 cm$^2$ or more.

Magnetic Unit

The wireless charging device according to an embodiment comprises a first magnetic unit and a second magnetic unit having a magnetic permeability higher than that of the first magnetic unit.

As a material having a strong magnetic focusing force is used as the second magnetic unit as described above, it is possible to compensate for the disadvantages of the first magnetic unit, which may cause a decrease in the charging efficiency due to a weak magnetic focusing force. If the first magnetic unit alone is used without the second magnetic unit, it may produce the effect of impact resistance and a reduction in weight, whereas the magnetic focusing force is weak, thereby deteriorating the charging efficiency. Meanwhile, although the second magnetic unit has a strong magnetic focusing force, it may be hardly processed to a large flat plate, and there may be limitations in manufacturing and processing it in the form of a thick layer for automobiles. Thus, as the second magnetic unit having a strong magnetic focusing force is adopted together with the first magnetic unit having high impact resistance and a weight reduction effect, the performance of the wireless charging device can be efficiently enhanced.

For example, the wireless charging device may comprise a first magnetic unit disposed on the coil unit and a second magnetic unit disposed on the first magnetic unit and having a magnetic permeability higher than that of the first magnetic unit. In addition, the first magnetic unit and the second magnetic unit may be disposed between the coil unit and the shield unit.

According to a specific example, the first magnetic unit may comprise a binder resin and a magnetic powder dispersed in the binder resin, and the second magnetic unit may comprise a ferrite-based magnetic material.

The first magnetic unit and the second magnetic unit may have magnetic characteristics in a certain range in the vicinity of a standard frequency for wireless charging of an electric vehicle. The standard frequency for wireless charging of an electric vehicle may be less than 100 kHz, for example, 79 kHz to 90 kHz, specifically, 81 kHz to 90 kHz, more specifically, about 85 kHz. It is a band distinct from the frequency applied to mobile electronic devices such as cell phones.

In particular, the first magnetic unit and the second magnetic unit have differences in such magnetic properties as magnetic permeability and magnetic permeability loss depending on the components constituting them. As a result, the two types of magnetic units are combined, whereby it is possible to effectively disperse the heat generated during wireless charging through the distribution of magnetic flux.

For example, the second magnetic unit may have a magnetic permeability at 85 kHz higher than that of the first magnetic unit. In addition, the second magnetic unit may have a magnetic permeability loss at 85 kHz higher than that of the first magnetic unit.

Specifically, the difference in magnetic permeability at 85 kHz between the second magnetic unit and the first magnetic unit may be 100 or more, 500 or more, or 1,000 or more, specifically, 100 to 5,000, 500 to 4,000, or 1,000 to 3,000. In addition, the difference in magnetic permeability loss at 85 kHz between the second magnetic unit and the first magnetic unit may be 10 or more, 50 or more, or 100 or more, specifically, 10 to 300, 50 to 250, or 100 to 200.

Specifically, the first magnetic unit may have a magnetic permeability of 5 to 300 at a frequency of 85 kHz, and the second magnetic unit may have a magnetic permeability of 1,000 to 5,000 at a frequency of 85 kHz. More specifically, the first magnetic unit may have a magnetic permeability of 5 to 300 and a magnetic permeability loss of 0 to 30 at 85 kHz, and the second magnetic unit may have a magnetic permeability of 1,000 to 5,000 and a magnetic permeability loss of 0 to 300 at 85 kHz.

Although the magnetic flux density during wireless charging is higher as it is closer to the coil unit, if the magnetic unit is around the coil unit, the magnetic flux is focused on the magnetic unit. If two or more magnetic units are adopted, the magnetic flux density increases in the order of the magnitude of magnetic permeability of the magnetic unit. Thus, if the second magnetic unit having a magnetic permeability higher than that of the first magnetic unit is properly arranged, the magnetic flux can be effectively distributed.

In addition, since heat is generated during wireless charging in a magnitude proportional to the amount of magnetic flux focused on the magnetic unit and magnetic permeability loss, the two types of magnetic units also have a difference in the amount of heat generated during wireless charging. For example, during wireless charging such as power transmission or reception, specifically, when the coil unit receives wireless power from the outside, the amount of heat generated in the second magnetic unit may be greater than the amount of heat generated in the first magnetic unit.

Since the two types of magnetic units have different magnetic properties and amounts of heat generation as described above, the magnetic flux density that is focused during wireless charging can be distributed in a desired direction by using the tendency of the magnetic flux density to increase in the order of the magnitude of magnetic permeability depending on a method of arranging and combining them. In addition, it is possible to effectively dissipate heat to the outside by using the tendency of the amount of heat generation that is increased in proportion to the amount of magnetic flux and the size of the magnetic permeability loss.

Referring to FIGS. 1a and 1b, the first magnetic unit (300) is disposed closer to the coil unit (200) than the second magnetic unit (500) is, and the second magnetic unit (500) is disposed closer to the shield unit (400) than the first magnetic unit (300) is. In such an event, the second magnetic unit may be thermally connected to the shield unit. As a result, the large amount of heat generated in the second magnetic unit may be readily discharged through the shield unit to the outside.

In addition, as the amounts (volumes) of the respective magnetic units adopted in view of the magnetic properties and physical properties of the two types of magnetic units are adjusted, it is possible to enhance the impact resistance and to reduce the manufacturing cost without impairing the charging efficiency. For example, the volume of the first magnetic unit may be larger than the volume of the second magnetic unit.

Hereinafter, the composition and characteristics of each magnetic unit will be described in detail.

First Magnetic Unit

The first magnetic unit may comprise a binder resin and a magnetic powder dispersed in the binder resin.

For example, the first magnetic unit may be a polymer-type magnetic material or a polymer-type magnetic block (PMB).

As the magnetic powder is coupled with each other by the binder resin, the first magnetic unit may have fewer defects over a large area and less damage caused by an impact.

The magnetic powder may be an oxide-based magnetic powder, a metal-based magnetic powder, or a mixed powder thereof. For example, the oxide-based magnetic powder may be a ferrite-based powder, specifically, a Ni—Zn-based, Mg—Zn-based, or Mn—Zn-based ferrite powder. In addition, the metal-based magnetic powder may be a Fe—Si—Al alloy magnetic powder or a Ni—Fe alloy magnetic powder, more specifically, a sendust powder or a permalloy powder.

As an example, the magnetic powder may have a composition of the following Formula 1.

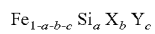
[Formula 1]

In the above formula, X is Al, Cr, Ni, Cu, or a combination thereof; Y is Mn, B, Co, Mo, or a combination thereof; $0.01 \leq a \leq 0.2$, $0.01 \leq b \leq 0.1$, and $0 \leq c \leq 0.05$.

In addition, the magnetic powder may be a nanocrystalline magnetic powder. For example, it may be a Fe-based nanocrystalline magnetic powder. Specifically, it may be a Fe—Si—Al-based nanocrystalline magnetic powder, a Fe—Si—Cr-based nanocrystalline magnetic powder, or a Fe—Si—B—Cu—Nb-based nanocrystalline magnetic powder.

The magnetic powder may have an average particle diameter in the range of about 3 nm to 1 mm, about 1 μm to 300 μm, about 1 μm to 50 μm, or about 1 μm to 10 μm. The first magnetic unit may comprise the magnetic powder in an amount of 10% by weight or more, 50% by weight or more, 70% by weight or more, or 85% by weight or more.

For example, the first magnetic unit may comprise the magnetic powder in an amount of 10% by weight to 99% by weight, 10% by weight to 95% by weight, 50% by weight to 95% by weight, 50% by weight to 92% by weight, 70% by weight to 95% by weight, 80% by weight to 95% by weight, or 80% by weight to 90% by weight.

Examples of the binder resin include a polyimide resin, a polyamide resin, a polycarbonate resin, an acrylonitrile-butadiene-styrene (ABS) resin, a polypropylene resin, a polyethylene resin, a polystyrene resin, a polyphenylene sulfide (PPS) resin, a polyether ether ketone (PEEK) resin, a silicone resin, an acrylic resin, a polyurethane resin, a polyester resin, an isocyanate resin, and an epoxy resin, but it is not limited thereto.

For example, the binder resin may be a curable resin. Specifically, the binder resin may be a photocurable resin and/or a thermosetting resin. In particular, it may be a resin capable of exhibiting adhesiveness upon curing. More specifically, the binder resin may be a resin comprising at least one functional group or moiety that can be cured by heat such as a glycidyl group, an isocyanate group, a hydroxyl group, a carboxyl group, or an amide group; or at least one functional group or moiety that can be cured by active energy such as an epoxide group, a cyclic ether group, a sulfide group, an acetal group, or a lactone group. Such a functional group or moiety may be, for example, an isocyanate group (—NCO), a hydroxyl group (—OH), or a carboxyl group (—COOH).

The first magnetic unit may comprise the binder resin in an amount of 5% by weight to 40% by weight, 5% by weight to 20% by weight, 5% by weight to 15% by weight, or 7% by weight to 15% by weight.

In addition, the first magnetic unit may comprise, based on the weight thereof, 6% by weight to 12% by weight of a polyurethane-based resin, 0.5% by weight to 2% by weight of an isocyanate-based curing agent, and 0.3% by weight to 1.5% by weight of an epoxy resin, as the binder resin.

Characteristics of the First Magnetic Unit

The first magnetic unit may have magnetic characteristics in a certain range in the vicinity of a standard frequency for wireless charging of an electric vehicle.

The magnetic permeability of the first magnetic unit at a frequency of 85 kHz may vary depending on the material. It may be in the range of 5 to 150,000 and may specifically be in the range of 5 to 300, 500 to 3,500, or 10,000 to 150,000 depending on the specific material. In addition, the magnetic permeability loss of the first magnetic unit at a frequency of 85 kHz may vary depending on the material. It may be in the range of 0 to 50,000 and may specifically be 0 to 1,000, 1 to 100, 100 to 1,000, or 5,000 to 50,000 depending on the specific material.

As a specific example, when the first magnetic unit is a polymer-type magnetic unit comprising a magnetic powder and a binder resin, its magnetic permeability may be 5 to 500, 5 to 130, 15 to 80, or 10 to 50, and its magnetic permeability loss may be 0 to 50, 0 to 20, 0 to 15, or 0 to 5, at a frequency of 85 kHz.

In addition, the first magnetic unit may be elongated at a certain ratio. For example, the elongation of the first magnetic unit may be 0.5% or more. The elongation characteristic is difficult to obtain in a ceramic-based magnetic material to which a polymer is not applied. It may reduce damage even if a large-area magnetic unit is distorted by an impact. Specifically, the elongation of the first magnetic unit may be 0.5% or more, 1% or more, or 2.5% or more. There is no particular limitation to the upper limit of the elongation. However, if the content of the polymer resin is increased to enhance the elongation, such characteristics as inductance of the magnetic unit may be deteriorated. Thus, the elongation is preferably 10% or less.

The first magnetic unit has a small rate of change in characteristics before and after an impact and is significantly superior to those of conventional ferrite magnetic sheets. In the present specification, the rate of change (%) in certain characteristics before and after an impact may be calculated by the following equation.

$$\text{Rate of change (\%) in characteristic} = \text{characteristic value before impact} - \text{characteristic value after impact/characteristic value before impact} \times 100$$

For example, when the first magnetic unit is subjected to free-falling from a height of 1 m, it may have a rate of change in inductance of less than 5% or 3% or less before and after the impact. More specifically, the rate of change in inductance may be 0% to 3%, 0.001% to 2%, or 0.01% to 1.5%. Within the above range, since the rate of change in inductance before and after an impact is relatively small, the stability of the magnetic unit may be further enhanced.

In addition, when the first magnetic unit is subjected to free-falling from a height of 1 m, it may have a rate of change in Q factor (Ls/Rs) of 0% to 5%, 0.001% to 4%, or 0.01% to 2.5%, before and after the impact. Within the above range, since the change in characteristics before and after an impact is small, the stability and impact resistance of the magnetic unit may be further enhanced.

In addition, when the first magnetic unit is subjected to free-falling from a height of 1 m, it may have a rate of change in resistance of 0% to 2.8%, 0.001% to 1.8%, or 0.1% to 1.0%, before and after the impact. Within the above range, even if it is repeatedly applied in an environment where an actual impact and vibration are applied, the resistance value can be well maintained below a certain level.

In addition, when the first magnetic unit is subjected to free-falling from a height of 1 m, it may have a rate of change in charging efficiency of 0% to 6.8%, 0.001% to 5.8%, or 0.01% to 3.4%, before and after the impact. Within the above range, even if a large-area magnetic unit is repeatedly subjected to an impact or distortion, its characteristics can be more stably maintained.

Structural Characteristics of the First Magnetic Unit

As the first magnetic unit has a three-dimensional structure, the charging efficiency and heat dissipation characteristics can be further enhanced. Referring to FIGS. 3b and 3d, the first magnetic unit (300) may comprise an outer part (310) corresponding to a part where the coil unit (200) is disposed; and a central part (320) surrounded by the outer part (310), wherein the outer part (310) may have a thickness greater than the thickness of the central part (320). That is, the outer part of the first magnetic unit may be positioned to correspond to a part of the coil unit having a high density of a conductive wire. The central part of the first magnetic unit may be positioned to correspond to a part of the coil unit having a low density of a conductive wire. In such an event, the outer part and the central part in the first magnetic unit may be integrally formed with each other.

As described above, as the thickness of the magnetic unit near the coil where electromagnetic energy is concentrated during wireless charging is increased and as the thickness of the central magnetic unit having a relatively low electromagnetic energy density since no coil is present there is decreased, it is possible not only to effectively focus electromagnetic waves concentrated around the coil, thereby enhancing the charging efficiency, but also to maintain the distance between the coil and the shield unit firmly without a separate spacer, thereby reducing the material and process costs to be incurred by the use of a spacer and the like.

In the first magnetic unit, the outer part may have a thickness that is thicker than that of the central part by 1.5 times or more. Within the above thickness ratio, it is possible to more effectively focus electromagnetic waves concentrated around the coil to enhance the charging efficiency, and it is also advantageous for heat generation and weight reduction. Specifically, in the first magnetic unit, the thickness ratio of the outer part to the central part may be 2 or more, 3 or more, or 5 or more. In addition, the thickness ratio may be 100 or less, 50 or less, 30 or less, or 10 or less. More specifically, the thickness ratio may be 1.5 to 100, 2 to 50, 3 to 30, or 5 to 10.

The thickness of the outer part of the first magnetic unit may be 1 mm or more, 3 mm or more, or 5 mm or more, and 30 mm or less, 20 mm or less, or 11 mm or less. In addition, the thickness of the central part of the first magnetic unit may be 10 mm or less, 7 mm or less, or 5 mm or less, and 0 mm, 0.1 mm or more, or 1 mm or more. Specifically, the outer part of the first magnetic unit may have a thickness of 5 mm to 11 mm, and the central part thereof may have a thickness of 0 mm to 5 mm.

When the thickness of the central part (320) of the first magnetic unit (300) is 0, the first magnetic unit (300) may have an empty shape in the central part (320) (e.g., a donut shape). In such a case, the first magnetic unit may effectively enhance the charging efficiency even with a smaller area.

Alternatively, the first magnetic unit may have a planar structure rather than a three-dimensional structure. That is, referring to FIGS. 3a and 3c, in the first magnetic unit (300), the outer part (310) and the central part (320) may have the same thickness.

Composition and Characteristics of the Second Magnetic Unit

The second magnetic unit may comprise an oxide-based magnetic material, a metal-based magnetic material, or a composite material thereof.

For example, the oxide-based magnetic material may be a ferrite-based magnetic material. A specific chemical formula thereof may be represented by $MOFe_2O_3$ (wherein M is one or more divalent metal elements such as Mn, Zn, Cu, and Ni). The ferrite-based magnetic material is preferably a sintered one from the viewpoint of such magnetic characteristics as magnetic permeability. The ferrite-based magnetic material may be prepared in the form of a sheet or a block by mixing raw materials, followed by calcining, pulverizing, mixing with a binder resin, molding, and sintering.

More specifically, the oxide-based magnetic material may be a Ni—Zn-based, Mg—Zn-based, or Mn—Zn-based ferrite. In particular, Mn—Zn-based ferrite may exhibit high magnetic permeability, low magnetic permeability loss, and high saturation magnetic flux density over a temperature range of room temperature to 100° C. or higher at a frequency of 85 kHz.

The Mn—Zn-based ferrite comprises 66% by mole to 70% by mole of $Fe_2O_3$, 10% by mole to 20% by mole of ZnO, 8% by mole to 24% by mole of MnO, and 0.4% by mole to 2% by mole of NiO as main components and may further comprise SiO2, CaO, $Nb_2O_5$, $ZrO_2$, SnO, and the like as additional subcomponents. The Mn—Zn-based ferrite may be prepared in the form of a sheet or a block by mixing the main components at predetermined molar ratios, calcining them in the air at a temperature of 800° C. to 1,100° C. for 1 hour to 3 hours, adding the subcomponents thereto and pulverizing them, mixing them with a binder resin such as polyvinyl alcohol (PVA) in an appropriate amount, press-molding them using a press, and sintering them by raising the temperature to 1,200° C. to 1,300° C. for 2 hours or longer. Thereafter, it is processed using a wire saw or a water jet and cut to a required size, if necessary.

In addition, the metal-based magnetic material may be a Fe—Si—Al alloy magnetic material or a Ni—Fe alloy magnetic material, more specifically, a sendust or a permalloy. In addition, the second magnetic unit may comprise a nanocrystalline magnetic material. For example, it may be a Fe-based nanocrystalline magnetic material. Specifically, it may comprise a Fe—Si—Al-based nanocrystalline magnetic material, a Fe—Si—Cr-based nanocrystalline magnetic material, or a Fe—Si—B—Cu—Nb-based nanocrystalline magnetic material. If the nanocrystalline magnetic material is used as the second magnetic unit, the longer the distance from the coil unit, the lower the resistance (Rs) even if the inductance (Ls) of the coil is lowered. Thus, the quality factor (Q factor: Ls/Rs) of the coil is increased, which may enhance the charging efficiency and reduce the generation of heat.

The second magnetic unit may be formed of a magnetic material different from that of the first magnetic unit. As a specific example, the first magnetic unit may comprise a Fe—Si—Al-based alloy magnetic material, and the second magnetic unit may comprise one or more selected from the group consisting of Mn—Zn-based ferrite, a Fe—Si—Al-based nanocrystalline magnetic material, a Fe—Si—Cr-based nanocrystalline magnetic material, and a Fe—Si—B—Cu—Nb-based nanocrystalline magnetic material. The combination of these materials is advantageous in that the second magnetic unit has a higher magnetic permeability at 85 kHz than that of the first magnetic unit.

The second magnetic unit may have magnetic characteristics in a specific range in the vicinity of a standard frequency for wireless charging of an electric vehicle.

For example, the magnetic permeability of the second magnetic unit at a frequency of 85 kHz may vary depending on the material. It may be in the range of 5 to 150,000 and may specifically be in the range of 5 to 300, 500 to 3,500, or 10,000 to 150,000 depending on the specific material. In addition, the magnetic permeability loss of the second magnetic unit at a frequency of 85 kHz may vary depending on the material. It may be in the range of 0 to 50,000 and may specifically be 0 to 1,000, 1 to 100, 100 to 1,000, or 5,000 to 50,000 depending on the specific material.

As a specific example, if the second magnetic unit is a ferrite-based magnetic material, the second magnetic unit may have a magnetic permeability of 1,000 to 20,000, 1,000 to 5,000, or 2,000 to 4,000, and a magnetic permeability loss of 0 to 1,000, 0 to 100, or 0 to 50, at a frequency of 85 kHz.

Areas and Thicknesses of the First Magnetic Unit and the Second Magnetic Unit

The first magnetic unit may have a large area. Specifically, it may have an area of 200 $cm^2$ or more, 400 $cm^2$ or more, or 600 $cm^2$ or more. In addition, the first magnetic unit may have an area of 10,000 $cm^2$ or less. In addition, the first magnetic unit of a large area may be configured by combining a plurality of unit magnetic materials. In such an event, the area of the individual unit magnetic materials may be 60 $cm^2$ or more, 90 $cm^2$, or 95 $cm^2$ to 900 $cm^2$.

Alternatively, the first magnetic unit may have an empty shape in the center. In such a case, the first magnetic unit may have an area of the outer part, that is, an area corresponding to the coil unit.

The first magnetic unit may be a magnetic block prepared by a method such as molding through a mold. For example, the first magnetic unit may be one molded into a three-dimensional structure through a mold. Such a magnetic block may be obtained by mixing a magnetic powder and a binder resin and injecting it into a mold by injection molding to be molded to a three-dimensional structure.

Specifically, the molding may be carried out by injecting the raw materials for the magnetic unit into a mold by injection molding. More specifically, the magnetic unit may be prepared by mixing a magnetic powder and a polymer resin composition to obtain a raw material composition, and then injecting the raw material composition (301) into a mold (3) by an injection molding machine (2) as shown in FIG. 10. In such an event, the internal shape of the mold (3) may be designed as a three-dimensional structure, so that the three-dimensional structure of the magnetic unit may be easily achieved. Such a process may be hardly carried out in which a conventional sintered ferrite sheet is used as a magnetic unit.

Alternatively, the first magnetic unit may be a laminate of magnetic sheets. For example, it may be one in which 20 or more or 50 or more magnetic sheets are laminated.

Specifically, in the magnetic sheet laminate, one or more magnetic sheets may be further laminated only on the outer part of the first magnetic unit. In such an event, the magnetic sheets each may have a thickness of 80 μm or more or 85 μm to 150 μm. Such a magnetic sheet may be prepared by a conventional sheet-forming process such as mixing a magnetic powder and a binder resin to form a slurry, then molding it into a sheet shape, and curing it.

The second magnetic unit may have a sheet shape or a block shape.

The second magnetic unit may have a thickness of 0.5 mm to 5 mm, specifically, 0.5 mm to 3 mm, 0.5 mm to 2 mm, or 1 mm to 2 mm. The thickness of the outer part of the first magnetic unit may be larger than the thickness of the second magnetic unit. For example, the thickness of the outer part may be 5 mm to 11 mm, and the thickness of the second magnetic unit may be 0.5 mm to 3 mm.

Meanwhile, the second magnetic unit may have a thinner thickness and a higher magnetic permeability at a frequency of 85 kHz than those of the first magnetic unit. In the wireless charging device designed by optimizing the thickness ratio and permeability of the first magnetic unit and the second magnetic unit, it is possible to maximize the charging efficiency and the characteristics of reducing heat generation, particularly at high power.

The total thickness of the first magnetic unit and the second magnetic unit may be 2.1 mm to 10 mm, 3.0 mm to 9 mm, or 4.0 mm to 8 mm. If the total thickness of the first magnetic unit and the second magnetic unit is too thick, the weight of the magnetic unit may increase, which may cause restrictions on the process or use thereof.

The second magnetic unit may have the same area as, a different area from, that of the first magnetic unit.

For example, the second magnetic unit may have the same large area as that of the first magnetic unit. Specifically, the second magnetic unit may have an area of 200 cm$^2$ or more, 400 cm$^2$ or more, or 600 cm$^2$ or more. In addition, the second magnetic unit may have an area of 10,000 cm$^2$ or less. In addition, the second magnetic unit of a large area may be configured by combining a plurality of unit magnetic materials. In such an event, the area of the individual unit magnetic materials may be 60 cm$^2$ or more, 90 cm$^2$, or 95 cm$^2$ to 900 cm$^2$.

Alternatively, the second magnetic unit may have a smaller area than that of the first magnetic unit. For example, if the second magnetic unit is disposed only on the outer part of the first magnetic unit, the second magnetic unit may have an area corresponding to the area of the outer part. In addition, accordingly, the second magnetic unit may be disposed at a position corresponding to the coil unit and may have an area corresponding to the area of the coil unit. In such a case, the second magnetic unit may effectively enhance the charging efficiency and heat dissipation characteristics even with a smaller area.

Heat Generation of the First Magnetic Unit and the Second Magnetic Unit

The magnetic unit may form a magnetic path of a magnetic field formed around the coil unit and is disposed between the coil unit and the shield unit.

Referring to FIGS. 1a and 1b, the wireless charging device (10) may comprise a hybrid-type magnetic unit in which a first magnetic unit (300) and a second magnetic unit (500) having different amounts of heat generation are combined.

Specifically, the second magnetic unit (500) may be disposed on the first magnetic unit. When the coil unit (200) receives wireless power from the outside, more heat may be generated in the second magnetic unit (500) than in the first magnetic unit (300).

As the second magnetic unit (500) having a larger amount of heat generated during wireless charging than that of the first magnetic unit (300) is disposed closer to the shield unit (400), it is possible to effectively distribute the magnetic flux density and heat dissipation, thereby increasing the wireless charging efficiency, and to dissipate the heat generated from the second magnetic unit (500) through the shield unit (400), thereby effectively enhancing the heat dissipation characteristics.

Specifically, when the coil unit receives wireless power from the outside, the magnetic unit may have a temperature in a specific range, thereby enhancing the effect of reducing heat generation.

Referring to FIGS. 3a to 3d, when the coil unit receives wireless power having a frequency of 85 kHz and an output of 6.6 kW for 10 minutes, the temperature ($T1_{10}$) of the lower side (P1) (that is, the side of the first magnetic unit facing the coil unit) of the first magnetic unit (300) may be lower by 1° C. or more than the temperature ($T2_{10}$) of the upper side (P2) (that is, the side of the second magnetic unit facing the shield unit) of the second magnetic unit (500). If the above range is satisfied, it is possible to maximize the charging efficiency and characteristics of reducing heat generation.

Specifically, when the coil unit receives wireless power for 10 minutes, the temperature ($T1_{10}$) of the lower side of the first magnetic unit may be lower than the temperature ($T2_{10}$) of the upper side of the second magnetic unit by 1° C. to 5° C., for example, may be lower by 1° C. to 4° C., 1° C. to 3° C., or 2° C. to 3° C. If only one of the first magnetic unit and the second magnetic unit is adopted or if the arrangement of the first magnetic unit and the second magnetic unit is altered, $T1_{10}$ may be equal to, or higher than, $T2_{10}$. In such a case, the generation of heat may be increased during fast charging and high-power wireless charging, which may cause safety problems such as damage to the wireless charging device and the possibility that the power conversion circuit is broken, resulting in limitation in the usability, or reduce the charging efficiency.

The measurement of the surface temperature of the magnetic unit may be carried out under the SAE J2954 WPT2 Z2 class Standard TEST charging efficiency measurement conditions stipulated by the Society of Automotive Engineers (SAE) of the United States. The above standard is based on various contents such as the performance by capacity, interoperability, vertical and horizontal separation distance references for producing rated output, communication method between transceivers, operating frequency, electromagnetic interface (EMI)/electromagnetic compatibility (EMC), and stability of a wireless power transmission system. Since the above standard provides not only system performance but also specifications of transceivers for each capacity band, most automobile manufacturers comply with the configuration and size of transceivers suggested in the above standard when they manufacture transceivers.

Specifically, while the coil unit receives wireless power having a frequency of 85 kHz and an output of 6.6 kW for 10 minutes or 60 minutes, the lower side (P1) of the first magnetic unit and the upper side (P2) of the second magnetic unit are respectively measured using a T/GUARD 405-SYSTEM manufactured by Qualitrol as shown in FIGS. 3a to 3d. Here, the surface temperature may be measured based on the center point in the outer part, which is a position corresponding to the coil uni.

$T1_{10}$ may be, for example, 55° C. to 75° C., 57° C. to 73° C., 58° C. to 70° C., or 58° C. to 67° C.

In addition, $T2_{10}$ may be, for example, 56° C. to 76° C., 58° C. to 74° C., 59° C. to 71° C., or 60° C. to 70° C.

In addition, when the coil unit receives wireless power having a frequency of 85 kHz and an output of 6.6 kW for 60 minutes, the temperature ($T1_{60}$) of the lower side of the first magnetic unit and the temperature ($T2_{60}$) of the upper side of the second magnetic unit may be 100° C. to 180° C., respectively.

$T16_o$ may be, for example, 100° C. to 180° C., 120° C. to 180° C., 130° C. to 180° C., 130° C. to 160° C., or 136° C. to 150° C.

In addition, $T2_{60}$ may be, for example, 100° C. to 180° C., 120° C. to 180° C., 120° C. to 170° C., 125° C. to 165° C., or 130° C. to 160° C.

As the first magnetic unit and the second magnetic unit each have a temperature in a specific range under the above conditions, it is possible to maximize the charging efficiency and characteristics of reducing heat generation.

If only one of the first magnetic unit and the second magnetic unit is adopted or if the arrangement of the first magnetic unit and the second magnetic unit is altered, $T1_{60}$ and the $T2_{60}$ may fall outside the above range. As a result, the temperature is continuously increased and high-temperature heat is generated, which may cause deformation and damage to the device structure.

In addition, when the coil unit receives wireless power having a frequency of 85 kHz and an output of 6.6 kW for 60 minutes, the temperature ($T1_{60}$) of the lower side of the first magnetic unit and the temperature ($T2_{60}$) of the upper side of the second magnetic unit may have a difference of 1° C. to 15° C. If the difference between $T1_{60}$ and $T2_{60}$ is too large, the magnetic flux is not properly distributed during wireless charging, whereby heat generated is not effectively transferred to the outside, and it may be easily damaged by an external impact that may be imposed during driving of the vehicle.

For example, the difference (absolute value) between $T1_{60}$ and $T2_{60}$ may be 1° C. to 15° C., 1° C. to 12° C., 2° C. to 12° C., 3° C. to 12° C., or 5° C. to 12° C.

In addition, as shown in FIGS. 3b and 3d, if the first magnetic unit has a three-dimensional structure and the second magnetic unit is in contact with the shield unit, $T2_{60}$ may be lower than $T1_{60}$. Specifically, $T2_{60}$ may be lower than $T1_{60}$ by about 1° C. to 10° C., 1° C. to 9° C., 1° C. to 8° C., 2° C. to 8° C., 3° C. to 7° C., 4° C. to 7° C., or 5° C. to 7° C. As the second magnetic unit having a larger amount of heat generation during wireless charging than that of the first magnetic unit is disposed to be in contact with the shield unit as described above, it is possible to effectively distribute the magnetic flux density and heat dissipation, thereby increasing the wireless charging efficiency, and to dissipate the heat generated from the second magnetic unit through the shield unit, thereby effectively enhancing the heat dissipation characteristics.

In addition, $T1_{60}$ may be higher than $T1_{10}$ by 50° C. to 100° C., and $T2_{60}$ may be higher than $T2_{10}$ by 50° C. to 100° C. Specifically, $T1_{60}$ may be higher than $T1_{10}$ by 50° C. to 90° C., 50° C. to 85° C., or 50° C. to 80° C., and $T2_{60}$ may be higher than $T2_{10}$ by 50° C. to 100° C., 50° C. to 90° C., 50° C. to 80° C., or 50° C. to 70° C. If the difference between $T1_{60}$ and $T1_{10}$ or the difference between $T2_{60}$ and $T2_{10}$ exceeds 100° C., the generation of heat may increase during fast charging and high-power wireless charging, which may cause limitations in the usability due to safety issues.

In addition, in the wireless charging device, if the first magnetic unit has a three-dimensional structure and the second magnetic unit is in contact with the shield unit as shown in FIGS. 3b and 3d, the heat dissipation effect and charging efficiency may be further enhanced as compared with the case in which the first magnetic unit has a planar structure or the second magnetic unit is not in contact with the shield unit as shown in FIGS. 3a and 3c. Specifically, if the first magnetic unit has a three-dimensional structure and the second magnetic unit is in contact with the shield unit as shown in FIGS. 3b and 3d, the difference between $T1_{60}$ and $T1_{10}$ and/or the difference between $T2_{60}$ and $T2_{10}$ may be 50° C. to 80° C., respectively. On the other hand, if the first magnetic unit has a planar structure or if the second magnetic unit is not in contact with the shield unit as shown in FIGS. 3a and 3c, the difference between $T1_{60}$ and $T1_{10}$ and/or the difference between $T2_{60}$ and $T2_{10}$ may be greater than 80° C. to 100° C., respectively.

The second magnetic unit may have a thermal conductivity higher than that of the first magnetic unit by 0.1 W/mK to 6 W/m·K. For example, the thermal conductivity of the second magnetic unit may be higher than that of the first magnetic unit by 0.1 W/mK to 6 W/mK, 0.5 W/mK to 5 W/mK, or 1 W/mK to 4 W/m·K. In such a case, as the second magnetic unit having a higher thermal conductivity than that of the first magnetic unit is disposed adjacent to the shield unit, it is possible to effectively disperse the heat generated during wireless charging through the distribution of magnetic flux and to enhance the durability against an external impact or distortion.

Arrangement of the Second Magnetic Unit

Since the second magnetic unit has a larger amount of heat generation during wireless charging than that of the first magnetic unit, it is preferable to be disposed close to the shield unit. For example, if a ferrite-based magnetic material is employed as the second magnetic unit, the ferrite-based magnetic material generates a lot of heat, but it may well dissipate heat. Thus, as the second magnetic unit having such an amount of heat generation is disposed close to the shield unit, the characteristics of reducing heat generation may be further enhanced. If the first magnetic unit comprising a polymer-type magnetic material having a small amount of heat generation is disposed close to the shield unit, the polymer component contained in the polymer-type magnetic material accumulates heat, which continuously raises the temperature over time, thereby adversely affecting the characteristics of reducing heat generation.

Specifically, referring to FIGS. 3a to 3d, the second magnetic unit (500) may be disposed on the first magnetic unit (300), that is, between the first magnetic unit (300) and the shield unit (400). As the second magnetic unit having a larger amount of heat generation than that of the first magnetic unit is disposed close to the shield unit, the high magnetic flux density around the coil unit can be effectively dispersed, whereby it is possible to not only increase the charging efficiency but also effectively dissipate the heat concentrated in the vicinity of the coil unit of the first magnetic unit as compared with the case in which the first magnetic unit alone is adopted.

In such an event, as shown in FIGS. 3b and 3d, at least a portion of the second magnetic unit (500) may be in contact with the shield unit (400). As a result, the heat generated in the second magnetic unit may be effectively discharged through the shield unit. For example, when the second magnetic unit is in the form of a sheet, one side thereof in its entirety may be in contact with the shield unit. Specifically, the second magnetic unit may be attached to one side of the shield unit facing the first magnetic unit. More specifically, the second magnetic unit may be attached to one side of the shield unit with a thermally conductive adhesive, thereby further enhancing the heat dissipation effect. The thermally conductive adhesive may comprise a thermally conductive material such as a metal-based, carbon-based, or ceramic-based adhesive, for example, an adhesive resin in which thermally conductive particles are dispersed.

As shown in FIG. 3a, the second magnetic unit (500) may be disposed on both the outer part (310) and the central part (320) of the first magnetic unit. Alternatively, as shown in FIGS. 3b to 3d, the second magnetic unit (500) may be disposed only on the outer part (310) of the first magnetic unit. Accordingly, a high magnetic flux density around the coil unit can be effectively dispersed, whereby it is possible to increase the charging efficiency as compared with the case in which the first magnetic unit alone is adopted. Alternatively, the second magnetic unit may be disposed over at least a portion of the outer part and the central part of the first magnetic unit.

The second magnetic unit may be disposed to be coupled to, or separated from, the first magnetic unit.

As an example, the second magnetic unit may be in contact with the first magnetic unit. Referring to FIGS. 3b to 3d, the second magnetic unit (500) may be attached to the outer part of the first magnetic unit (300).

Alternatively, the first magnetic unit and the second magnetic unit may be disposed spaced apart from each other. Specifically, the second magnetic unit may be disposed spaced apart from the first magnetic unit between the shield unit and the first magnetic unit. As a result, it is possible to distribute the magnetic flux between the first magnetic unit and the second magnetic unit and to appropriately adjust the heat generated according thereto. In addition, it is possible to impart appropriate durability against an external force such as an external impact or distortion that may be imposed during driving of the electric vehicle.

For example, the spaced distance between the first magnetic unit and the second magnetic unit may be 1 mm or more, 2 mm or more, 1 mm to 10 mm, 2 mm to 7 mm, 3 mm to 5 mm, or 5 mm to 10 mm. Specifically, the shortest distance between the first magnetic unit and the second magnetic unit may be 1 mm to 20 mm. More specifically, the shortest distance between the outer part of the first magnetic unit and the second magnetic unit may be 3 mm to 10 mm. Within the above range, it is advantageous for distributing the magnetic flux focused during wireless charging and to control the heat generated according thereto, and it is possible to impart appropriate durability against an external force imposed during driving of the vehicle.

Alternatively, referring to FIG. 3d, a groove may be provided on the surface of the first magnetic unit (300) facing the shield unit (400), and the second magnetic unit (500) may be inserted into the groove.

In such a case, since the first magnetic unit may serve as a housing of the second magnetic unit, a separate adhesive or structure for fixing the second magnetic unit may not be required. In particular, since the first magnetic unit may be molded into a three-dimensional structure through a mold using a polymer-type magnetic material using a magnetic powder and a binder resin, a groove for inserting the second magnetic unit may be easily formed.

In such a case, at least a portion of the first magnetic unit and the second magnetic unit may be in contact with the shield unit. As a result, the heat generated in the first magnetic unit and/or the second magnetic unit may be effectively discharged through the shield unit.

The depth of the groove formed in the first magnetic unit may be the same as, or different from, the thickness (height) of the second magnetic unit. If the depth of the groove and the thickness of the second magnetic unit are the same, the first magnetic unit and the second magnetic unit may be in contact with the shield unit at the same time. Alternatively, if the depth of the groove is smaller than the thickness of the second magnetic unit, only the second magnetic unit may be in contact with the shield unit. On the other hand, if the depth of the groove is larger than the thickness of the second magnetic unit, only the first magnetic unit may be in contact with the shield unit.

In addition, referring to FIGS. 3a and 3c, the second magnetic unit (500) may be disposed to be spaced apart from the shield unit (400) by a predetermined interval. In addition, it may further comprise an empty space or a spacer between the second magnetic unit (500) and the shield unit (400). The material and structure of the spacer may be a material and structure of a conventional spacer used in a wireless charging device.

Composition and Characteristics of the Heat Dissipation Unit

The wireless charging device according to an embodiment may further comprise a heat dissipation unit for effective heat transfer. A lot of heat is generated in the magnetic unit during wireless charging in proportion to the amount of the focused magnetic flux and the magnetic permeability loss. The heat dissipation unit can effectively transfer the heat generated in the magnetic unit to the outside.

The heat dissipation unit may have a sheet shape. That is, the heat dissipation unit may be a heat dissipation sheet.

The heat dissipation unit may comprise a binder resin and a heat dissipation filler dispersed in the binder resin. As described above, since the heat dissipation unit comprises a polymer component, it may provide an adhesive force between the shield unit and the magnetic sheet. In addition, it may prevent the magnetic unit from being damaged by an external impact.

Examples of the binder resin include a polyimide resin, a polyamide resin, a polycarbonate resin, an acrylonitrile-butadiene-styrene (ABS) resin, a polypropylene resin, a polyethylene resin, a polystyrene resin, a polyphenylene sulfide (PPS) resin, a polyether ether ketone (PEEK) resin, a silicone resin, an acrylic resin, a polyurethane resin, a polyester resin, an isocyanate resin, and an epoxy resin, but it is not limited thereto.

For example, the binder resin may be a curable resin. Specifically, the binder resin may be a photocurable resin and/or a thermosetting resin. In particular, it may be a resin capable of exhibiting adhesiveness upon curing. More specifically, the binder resin may be a resin comprising at least one functional group or moiety that can be cured by heat such as a glycidyl group, an isocyanate group, a hydroxyl group, a carboxyl group, or an amide group; or at least one functional group or moiety that can be cured by active energy such as an epoxide group, a cyclic ether group, a sulfide group, an acetal group, or a lactone group. Such a functional group or moiety may be, for example, an isocyanate group (—NCO), a hydroxyl group (—OH), or a carboxyl group (—COOH).

As a specific example, the binder resin may be one or more types of silicone-based resins and acrylic-based resins.

In addition, the heat dissipation filler may be one or more of ceramic particles, carbon particles, and metal particles. The ceramic particles may comprise an oxide or nitride of a metal. Specifically, they may comprise silica, alumina, boron nitride, aluminum nitride, magnesium oxide, and the like. The carbon particles may comprise graphite, carbon black, carbon nanotubes, and the like. The metal particles may comprise copper, silver, iron, nickel, and the like.

The content of the heat dissipation filler in the heat dissipation unit may be 70% by weight to 90% by weight, 70% by weight to 85% by weight, or 75% by weight to 90% by weight.

The heat dissipation unit may have a thermal conductivity of 0.5 W/mK to 30 W/mK, specifically, 2 W/mK to 5 W/m·K.

The heat dissipation unit may have a thickness of 0.1 mm to 5 mm, specifically, 0.1 mm to 3 mm or 0.2 mm to 1 mm.

The heat dissipation unit may have the same area as, a different area from, that of the first magnetic unit or the second magnetic unit. For example, if the heat dissipation unit is disposed on the outer part of the first magnetic unit, the heat dissipation unit may have an area corresponding to the area of the outer part. In addition, if the heat dissipation unit is disposed between the second magnetic unit and the shield unit, the heat dissipation unit may have an area corresponding to the area of the second magnetic unit. As a result, the heat dissipation unit may have excellent heat dissipation characteristics, adhesion, and impact resistance even with a small area.

Arrangement of the Heat Dissipation Unit

The heat dissipation unit is disposed between the magnetic unit and the shield unit. The heat dissipation unit may be in contact with the magnetic unit and the shield unit at the same time. Specifically, the heat dissipation unit may adhere the magnetic unit and the shield unit. More specifically, the heat dissipation unit may be in contact with the second magnetic unit and the shield unit at the same time. In addition, it may adhere the second magnetic unit and the shield unit. As a result, the heat generated in the second magnetic unit may be transferred to the shield unit through the heat dissipation unit and readily discharged to the outside.

As shown in FIG. 5a, the second magnetic unit (500) may be disposed on the first magnetic unit (300), and the heat dissipation unit (700) may be in contact with the second magnetic unit (500) and the shield unit (400) at the same time. As the second magnetic unit having a higher magnetic permeability than that of the first magnetic unit is disposed close to the shield unit, the high magnetic flux density around the coil can be effectively dispersed, whereby it is possible to not only increase the charging efficiency but also effectively disperse the heat generation concentrated on the first magnetic unit adjacent to the coil unit as compared with the case in which the first magnetic unit alone is adopted. In addition, here, the heat generated in the second magnetic unit may be effectively transferred to the shield unit through the heat dissipation unit.

For example, when the second magnetic unit is in the form of a sheet, one side thereof in its entirety may be attached to the shield unit via the heat dissipation unit. Specifically, the second magnetic unit may be attached to one side of the shield unit facing the first magnetic unit via the heat dissipation unit.

In addition, the second magnetic unit (500) and the heat dissipation unit (700) may be disposed on the outer part (310) of the first magnetic unit. As a result, it is possible to distribute the magnetic flux density focused in the vicinity of the coil unit and to effectively discharge the heat generated in the vicinity of the coil unit to the outside.

As shown in FIG. 5b, the first magnetic unit (300) has a groove on its surface facing the shield unit (400), the second magnetic unit (500) is inserted into the groove, and the heat dissipation unit (700) may in contact with at least one of the first magnetic unit (300) and the second magnetic unit (500) and the shield unit (400) at the same time.

In such a case, since the first magnetic unit may serve as a housing of the second magnetic unit, a separate adhesive or structure for fixing the second magnetic unit may not be required. In particular, since the first magnetic unit may be molded into a three-dimensional structure through a mold using a polymer-type magnetic material comprising a magnetic powder and a binder resin, a groove for inserting the second magnetic unit may be easily formed. In addition, here, the heat generated in the first magnetic unit and/or the second magnetic unit may be effectively transferred to the shield unit through the heat dissipation unit.

The depth of the groove formed in the first magnetic unit may be the same as, or different from, the thickness (height) of the second magnetic unit. If the depth of the groove and the thickness of the second magnetic unit are the same, the heat dissipation unit may be in contact with the first magnetic unit, the second magnetic unit, and the shield unit at the same time. Alternatively, if the depth of the groove is smaller than the thickness of the second magnetic unit, the heat dissipation unit may be in contact with only the second magnetic unit and the shield unit. On the other hand, if the depth of the groove is larger than the thickness of the second magnetic unit, the heat dissipation unit may be in contact with only the first magnetic unit and the shield unit.

As shown in FIG. 5c, the second magnetic unit (500) may be disposed to be embedded in the first magnetic unit (300), and the heat dissipation unit (700) may be in contact with the first magnetic unit (500) and the shield unit (400) at the same time.

Even in such a case, since the first magnetic unit may serve as a housing of the second magnetic unit, a separate adhesive or structure for fixing the second magnetic unit may not be required. In particular, since the first magnetic unit may be molded into a three-dimensional structure through a mold using a polymer-type magnetic material using a magnetic powder and a binder resin, a structure for embedding the second magnetic unit may be easily formed. In addition, here, the heat generated in the first magnetic unit may be effectively transferred to the shield unit through the heat dissipation unit.

Tray

As shown in FIGS. 6 to 9b, the wireless charging device (10) may further comprise a tray (800) disposed between the first magnetic unit (300) and the shield unit (400). Specifically, the wireless charging device (10) according to an embodiment may further comprise a tray (800) disposed between the first magnetic unit (300) and the second magnetic unit (500).

The tray may serve not only as a housing for fixing the second magnetic unit, but also as a spacer for separating the second magnetic unit from the first magnetic unit. That is, the second magnetic unit may be disposed to be spaced apart from the first magnetic unit by the tray.

The tray may comprise a seating groove for accommodating the second magnetic unit. As a result, the second magnetic unit may be disposed to be accommodated in the seating groove. In such a case, since the tray may serve as a housing of the second magnetic unit, a separate adhesive or structure for fixing the second magnetic unit may not be required. For example, the depth of the seating groove formed in the tray may be the same as, or different from, the thickness (height) of the second magnetic unit. In addition, if a heat dissipation unit is further disposed on the second magnetic unit, the depth of the seating groove formed in the tray may be the same as the sum of thicknesses of the second magnetic unit and the heat dissipation unit.

In addition, the tray may be in contact with the shield unit. Specifically, the tray may be fixed to the lower part of the shield unit. In addition, it may be disposed in contact with the first magnetic unit (e.g., the outer part of the first magnetic unit) as well.

Alternatively, the tray may be disposed to be spaced apart from the shield unit or the first magnetic unit by a predetermined interval. For example, the spaced distance between the tray and the shield unit or the spaced distance between the tray and the first magnetic unit (e.g., the outer part of the first magnetic unit) may be 0.5 mm or more or 1 mm or more, specifically, 0.5 mm to 5 mm or 1 mm to 3 mm.

The tray may be composed of a plastic material. Specifically, it may be composed of a heat-resistant plastic material. Specifically, the plastic material may be a thermoplastic polyimide. In addition, the plastic material may have a glass transition temperature (Tg) of 230° C. to 360° C., specifically, about 250 to 310° C.

In addition, the tray may further comprise a heat dissipation filler. In such an event, the material of the heat dissipation filler may be at least one selected from the group consisting of a ceramic-based material, an oxide-based material, and a carbon-based material. More specifically, it may be at least one selected from the group consisting of $Al_2O_3$, AlN, $SiO2$, and $Si_3N_4$. As a result, the heat generated in the first magnetic unit or the second magnetic unit may be transferred to the shield unit through the tray as well.

Support Unit

As shown in FIGS. 1a and 1b, the wireless charging device (10) may further comprise a support unit (100) for supporting the coil unit (200). The material and structure of the support unit may be a material and structure of a conventional support unit used in a wireless charging device. The support unit may have a flat plate structure or a structure in which a groove is formed in compliance with a coil shape to fix the coil unit.

Housing

As shown in FIGS. 1a and 1b, the wireless charging device (10) according to an embodiment may further comprise a housing (600) for accommodating the components described above.

The housing allows such components as the coil unit, the shield unit, and the magnetic unit to be properly disposed and assembled. The material and structure of the housing may be a material and structure of a conventional housing used in a wireless charging device. It may be appropriately designed according to the components adopted therein.

Charging Efficiency

Meanwhile, the wireless charging device of the present invention can effectively reduce the heat generation and enhance the charging efficiency during high-power wireless charging of 3 kW to 22 kW, 4 kW to 20 kW, or 5 kW to 18 kW. Thus, it can be advantageously used for high-power wireless charging.

In particular, as a three-dimensional structure is applied to the magnetic unit of the wireless charging device, the charging efficiency and characteristics of reducing heat generation can be further enhanced.

For example, the wireless charging device according to an embodiment may have a charging efficiency of 85% or more, 88% or more, 89% or more, 90% or more, or 91% or more.

Accordingly, the wireless charging device according to an embodiment can be advantageously used in a transportation means such as electric vehicles that requires large-capacity power transmission between a transmitter and a receiver.

Transportation Means

FIG. 11 shows a transportation means, specifically, an electric vehicle provided with a wireless charging device. Since it is provided with a wireless charging device on its lower side, it may be charged wirelessly in a parking area equipped with a wireless charging system for an electric vehicle.

Referring to FIG. 11, the transportation means (1) according to an embodiment comprises a wireless charging device according to the embodiment as a receiver (21). The wireless charging device may serve as a receiver for wireless charging of the transportation means (1) and may receive power from a transmitter (22) for wireless charging.

As described above, the transportation means comprises a wireless charging device, and the wireless charging device has a configuration as described above.

Specifically, the wireless charging device provided in a transportation means comprises a coil unit; a shield unit disposed on the coil unit; and a magnetic unit comprising a first magnetic unit and a second magnetic unit and disposed between the coil unit and the shield unit, wherein the second magnetic unit has a magnetic permeability at 85 kHz higher than that of the first magnetic unit.

The configuration and characteristics of each component of the wireless charging device adopted in the transportation means are as described above.

The transportation means may further comprise a battery for receiving power from the wireless charging device. The wireless charging device may receive power wirelessly and transmit it to the battery, and the battery may supply power to a driving system of the electric vehicle. The battery may be charged by power transmitted from the wireless charging device or other additional wired charging devices.

In addition, the transportation means may further comprise a signal transmitter for transmitting information about the charging to the transmitter of the wireless charging system. The information about such charging may be charging efficiency such as charging speed, charging state, and the like.

Embodiments for Carrying Out the Invention

Hereinafter, examples will be described, but the scope of implementation is not limited thereto.

Example 1: Manufacture of a Wireless Charging Device

Step 1: Preparation of a First Magnetic Unit—Three-Dimensional Structure 42.8 parts by weight of a magnetic powder, 15.4 parts by weight of a polyurethane-based resin dispersion (25% by weight of a polyurethane-based resin and 75% by weight of 2-butanone), 1.0 part by weight of an isocyanate-based curing agent dispersion (62% by weight of an isocyanate-based curing agent, 25% by weight of n-butyl acetate, and 13% by weight of 2-butanone), 0.4 part by weight of an epoxy-based resin dispersion (70% by weight of an epoxy-based resin, 3% by weight of n-butyl acetate, 15% by weight of 2-butanone, and 12% by weight of toluene), and 40.5 parts by weight of toluene were mixed in a planetary mixer at a speed of about 40-50 rpm for about 2 hours to prepare a magnetic powder slurry.

The magnetic powder slurry was injected into a mold (3) by an injection molding machine (2) as shown in FIG. 10 to have a three-dimensional structure (an outer part corresponding to a coil unit: 9 mm, the central part surrounded by the outer part: 1 mm). It was dried at a temperature of about 160° C. to obtain a first magnetic unit (a polymer-type magnetic material) having a three-dimensional structure.

Step 2: Preparation of a Hybrid-Type Magnetic Material

A ferrite-based magnetic material (PC-95 ferrite magnetic sheet manufactured by TDK Co., Ltd.) having a thickness of 1 mm as a second magnetic unit was disposed on the outer part, corresponding to the coil unit, of the first magnetic unit prepared in step 1, which was then thermocompression-bonded to obtain a hybrid-type magnetic material.

Step 3: Manufacture of a Wireless Charging Device

The hybrid-type magnetic material prepared in step 2 was combined with a support unit, a coil unit, a spacer, a shield unit, and a housing as shown in FIG. 3b to obtain a wireless charging device. Here, the side of the second magnetic unit (ferrite-based magnetic material) among both sides of the hybrid-type magnetic material was directed toward the shield unit.

Example 2: Manufacture of a Wireless Charging Device

Step 1: Preparation of a First Magnetic Unit—Planar Structure

The magnetic powder slurry prepared in step 1 of Example 1 was coated onto a carrier film by a comma coater, which was dried at a temperature of about 110° C. to form a polymer-type magnetic material. It was compression-hardened by a hot press process for about 60 minutes at a temperature of about 170° C. and a pressure of about 9 MPa to obtain a polymer-type magnetic material sheet. The content of magnetic powder in the sheet was about 90%, and the thickness of a single sheet was about 100 μm. 40 to 50 sheets of the above sheet were laminated to obtain a first magnetic unit having a thickness of about 4 mm.

Step 2: Preparation of a Hybrid-Type Magnetic Material

A ferrite-based magnetic material (PC-95 ferrite magnetic sheet manufactured by TDK Co., Ltd.) having a thickness of 1 mm as a second magnetic unit was disposed on the first magnetic unit prepared in step 1, which was then thermo-compression-bonded to obtain a hybrid magnetic material (having a thickness of 5 mm).

Step 3: Manufacture of a Wireless Charging Device

The hybrid-type magnetic material prepared in step 2 was combined with a support unit, a coil unit, a spacer, a shield unit, and a housing as shown in FIG. 3a to obtain a wireless charging device. Here, the side of the second magnetic unit (ferrite-based magnetic material) among both sides of the hybrid-type magnetic material was directed toward the shield unit.

Comparative Example 1: Manufacture of a Wireless Charging Device

A planar polymer-type magnetic material (a first magnetic unit) having a thickness of 5 mm was prepared in the same manner as in step 1 of Example 2, which was combined with a support unit, a coil unit, a spacer, a shield unit, and a housing to obtain a wireless charging device.

Comparative Example 2: Manufacture of a Wireless Charging Device

A ferrite-based magnetic material (PC-95 ferrite magnetic sheet manufactured by TDK Co., Ltd.) having a thickness of 5 mm was combined with a support unit, a coil unit, a spacer, a shield unit, and a housing to obtain a wireless charging device.

Test Example 1: Measurement of the Surface Temperature of Magnetic Units

The surface temperatures of the first magnetic unit and the second magnetic unit of the wireless charging devices manufactured in the Examples and Comparative Examples were measured under the SAE J2954 WPT2 Z2 class Standard TEST charging efficiency measurement conditions when the coil unit received wireless power having a frequency of 85 kHz and an output of 6.6 kW for 10 minutes or 60 minutes.

The surface temperature of the magnetic unit for the lower and upper sides thereof was measured using a T/GUARD 405-SYSTEM manufactured by Qualitrol. Specifically, for Examples 1 and 2, as shown in FIGS. 3a and 3b, the temperature on the upper side and the lower side of the hybrid-type magnetic material, that is, the lower side (P1) of the first magnetic unit (300) and the upper side (P2) of the second magnetic unit (500) was measured, respectively. In addition, for Comparative Example 1, the temperature was measured on the lower and upper sides of the first magnetic unit, respectively. For Comparative Example 2, the temperature was measured on the lower and upper sides of the second magnetic unit, respectively.

The results of measurement of the surface temperature of the magnetic units are summarized below and shown in Table 1.

$T1_{10}$ (° C.): the temperature of the lower side (P1) of the first magnetic unit (or the temperature of the lower side of the second magnetic unit for Comparative Example 2) when the coil unit received wireless power for 10 minutes $T2_{10}$ (° C.): the temperature of the upper side (P2) of the second magnetic unit (or the temperature of the upper side of the first magnetic unit for Comparative Example 1) when the coil unit received wireless power for 10 minutes $T1_{60}$ (° C.): the temperature of the lower side (P1) of the first magnetic unit (or the temperature of the lower side of the second magnetic unit for Comparative Example 2) when the coil unit received wireless power for 60 minutes $T2_{60}$ (° C.): the temperature of the upper side (P2) of the second magnetic unit (or the temperature of the upper side of the first magnetic unit for Comparative Example 1) when the coil unit received wireless power for 60 minutes In addition, the specific position for temperature measurement on the lower and upper sides of the magnetic unit was set as the center point of the region where the conductive wire was present in the coil unit (200) (i.e., the center point of the outer part (310) of the first magnetic unit).

Test Example 1: Measurement of Charging Efficiency

The charging efficiency was measured by SAE J2954 WPT2 Z2 class standard test method. Specifically, a device in which a coil unit and a frame under the SAE J2954 WPT2 Z2 class standard test specifications were used, and a magnetic unit, a spacer, and an aluminum plate were stacked to prepare a transmitter (75 cm×60 cm). The wireless charging devices of the Examples and Comparative Example were each used as a receiver (35 cm×35 cm). The charging efficiency was measured under the conditions of a frequency of 85 kHz and an output power of 6.6 kW.

The results are shown in Table 1 below.

TABLE 1

|  |  | Ex. 1 | Ex. 2 | C. Ex. 1 | C. Ex. 2 |
|---|---|---|---|---|---|
| 10 minutes | $T1_{10}$ (° C.) | 58 | 67 | 80 | 50 |
|  | $T2_{10}$ (° C.) | 60 | 70 | 80 | 50 |
| 60 minutes | $T1_{60}$ (° C.) | 136 | 150 | 190 | 90 |
|  | $T2_{60}$ (° C.) | 130 | 160 | 200 | 90 |
| Charging efficiency (%) |  | 90 | 90 | 87 | 91 |
| Weight (kg) |  | 3.5 | 3.5 | 3.4 | 4 |

As shown in Table 1, in the wireless charging devices of Examples 1 and 2 that adopted a hybrid-type magnetic material in which a first magnetic unit and a second magnetic unit having different amounts of heat generation were combined and the second magnetic unit was disposed close to the shield unit, the magnetic flux density and heat generation were effectively distributed, thereby enhancing the wireless charging efficiency, as compared with those of Comparative Examples 1 and 2 in which a first magnetic or and a second magnetic unit alone was adopted.

Specifically, when the coil unit received wireless power for 10 minutes, the temperature ($T1_{10}$) of the lower side of the magnetic unit was lower than the temperature ($T2_{10}$) of the upper side thereof by about 1° C. to 3° C. in the wireless charging devices of Examples 1 and 2, whereas the temperature ($T1_{10}$) of the lower side of the magnetic unit was the same as the temperature ($T2_{10}$) of the upper side thereof in the wireless charging devices of Comparative Examples 1 and 2.

Meanwhile, in the wireless charging devices of Examples 1 and 2, when the coil unit received wireless power for 60 minutes, the temperature ($T1_{60}$) of the lower side of the magnetic unit and the temperature ($T2_{60}$) of the upper side thereof did not exceed 180° C., and the difference therebetween (that is, the difference between $T1_{60}$ and $T2_{60}$) did not exceed 15° C. In addition, in the wireless charging devices of Examples 1 and 2, when the coil unit received wireless power for 10 minutes and 60 minutes, the change in temperature (i.e., the change from $T1_{10}$ to $T1_{60}$ and the change from $T2_{10}$ to $T2_{60}$) did not exceed 100° C.

In addition, in the wireless charging device of Example 1, when the coil unit received wireless power for 60 minutes, the temperature was significantly lowered as compared with the wireless charging device of Example 2. In particular, as a three-dimensional structure was applied to the first magnetic unit of the wireless charging device of Example 1, the temperature ($T2_{60}$) of the upper side of the second magnetic unit in contact with the shield unit was lowered by about 6° C. as compared with the temperature ($T1_{60}$) of the lower side of the first magnetic unit, confirming that the effect of reducing heat generation was the most excellent.

In contrast, in the wireless charging device of Comparative Example 1, all of the measured temperatures (i.e., $T1_{10}$, $T2_{10}$, $T1_{60}$, and $T2_{60}$) of the magnetic unit were significantly higher than those of Examples 1 and 2, confirming that the heat generation was increased. In addition, in the wireless charging device of Comparative Example 2, the impact resistance may be deteriorated since a ferrite sheet alone was used, there may be a problem of weight increase and cost increase, and a separate frame is required for attaching and assembling the magnetic unit, which is not favorable.

The invention claimed is:

1. A wireless charging device, which comprises a coil unit; a shield unit disposed on the coil unit; and a magnetic unit comprising a first magnetic unit and a second magnetic unit and disposed between the coil unit and the shield unit, wherein the second magnetic unit has a magnetic permeability at 85 kHz higher than that of the first magnetic unit, and wherein the second magnetic unit has a thermal conductivity higher than that of the first magnetic unit by 0.1 W/m·K to 6 W/m·K.

2. The wireless charging device of claim 1, wherein the second magnetic unit is disposed on the first magnetic unit, and when the coil unit receives wireless power from the outside, more heat is generated in the second magnetic unit than in the first magnetic unit.

3. The wireless charging device of claim 2, wherein when the coil unit receives wireless power having a frequency of 85 kHz and an output of 6.6 kW for 10 minutes, the temperature ($T1_{10}$) of the lower side of the first magnetic unit is lower than the temperature ($T2_{10}$) of the upper side of the second magnetic unit by 1° C. or more.

4. The wireless charging device of claim 3, wherein when the coil unit receives wireless power having a frequency of 85 kHz and an output of 6.6 kW for 60 minutes, the temperature ($T1_{60}$) of the lower side of the first magnetic unit and the temperature ($T2_{60}$) of the upper side of the second magnetic unit has a difference of 1° C. to 15° C.

5. The wireless charging device of claim 4, wherein $T1_{60}$ is higher than $T1_{10}$ by 50° C. to 100° C., and $T2_{60}$ is higher than $T2_{10}$ by 50° C. to 100° C.

6. The wireless charging device of claim 1, wherein the wireless charging device further comprises a heat dissipation unit disposed between the shield unit and the magnetic unit, the first magnetic unit comprises an outer part corresponding to a part where the coil unit is disposed; and a central part surrounded by the outer part, and the outer part has a thickness greater than the thickness of the central part.

7. The wireless charging device of claim 6, wherein the heat dissipation unit comprises a binder resin and a heat dissipation filler dispersed in the binder resin, and the heat dissipation unit adheres the magnetic unit and the shield unit.

8. The wireless charging device of claim 6, wherein the first magnetic unit has a magnetic permeability of 5 to 300 at a frequency of 85 kHz, and the second magnetic unit has a magnetic permeability of 1,000 to 5,000 at a frequency of 85 kHz.

9. The wireless charging device of claim 6, wherein the second magnetic unit and the heat dissipation unit are disposed on the outer part of the first magnetic unit.

10. The wireless charging device of claim 6, wherein the second magnetic unit is disposed on the first magnetic unit, and the heat dissipation unit is in contact with the second magnetic unit and the shield unit at the same time.

11. The wireless charging device of claim 1, wherein the second magnetic unit is disposed on the first magnetic unit, and the second magnetic unit is thermally connected to the shield unit.

12. The wireless charging device of claim 11, wherein the first magnetic unit and the second magnetic unit are spaced apart from each other, and the shortest distance between the first magnetic unit and the second magnetic unit is 1 mm to 20 mm.

13. The wireless charging device of claim 11, wherein the wireless charging device further comprises a tray disposed between the first magnetic unit and the second magnetic unit, the tray comprises a seating groove for accommodating the second magnetic unit, and the tray is fixed to the lower part of the shield unit.

14. A transportation means, which comprises a wireless charging device, wherein the wireless charging device comprises a coil unit; a shield unit disposed on the coil unit; and a magnetic unit comprising a first magnetic unit and a second magnetic unit and disposed between the coil unit and the shield unit, and the second magnetic unit has a magnetic permeability at 85 kHz higher than that of the first magnetic unit, and wherein the second magnetic unit has a thermal conductivity higher than that of the first magnetic unit by 0.1 W/m·K to 6 W/m·K.

* * * * *